(12) United States Patent
Hattori et al.

(10) Patent No.: US 12,145,602 B2
(45) Date of Patent: Nov. 19, 2024

(54) VEHICLE CONTROL DEVICE AND METHOD FOR CONTROLLING VEHICLE

(71) Applicant: KABUSHIKI KAISHA TOYOTA JIDOSHOKKI, Kariya (JP)

(72) Inventors: Tatsuya Hattori, Aichi-ken (JP); Hiroyuki Yamaguchi, Aichi-ken (JP); Yoshikazu Hattori, Aichi-ken (JP); Masateru Amano, Aichi-ken (JP); Noriyoshi Suzuki, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 28 days.

(21) Appl. No.: 17/691,411

(22) Filed: Mar. 10, 2022

(65) Prior Publication Data

US 2022/0289208 A1    Sep. 15, 2022

(30) Foreign Application Priority Data

Mar. 12, 2021  (JP) .................................. 2021-040319
Feb. 25, 2022  (JP) .................................. 2022-028502

(51) Int. Cl.
*B60W 40/13*   (2012.01)
*B60W 40/10*   (2012.01)
(Continued)

(52) U.S. Cl.
CPC ............ *B60W 40/13* (2013.01); *B60W 40/10* (2013.01); *B66F 9/0755* (2013.01); *B66F 17/003* (2013.01)

(58) Field of Classification Search
CPC ...... B60W 40/13; B60W 40/10; B60W 10/18; B60W 2040/1307; B60W 2300/121;
(Continued)

(56) References Cited

U.S. PATENT DOCUMENTS

| 4,664,452 A  | * | 5/1987 | Kubota  | .................. | B60T 8/266 |
| | | | | | 303/22.8 |
| 7,216,024 B1 | * | 5/2007 | Abels  | .................... | B66F 17/003 |
| | | | | | 37/304 |

(Continued)

FOREIGN PATENT DOCUMENTS

JP    4747722 B2    8/2011
JP    6282108 B2    2/2018

*Primary Examiner* — Tyler J Lee
*Assistant Examiner* — Yufeng Zhang
(74) *Attorney, Agent, or Firm* — Sughrue Mion, PLLC

(57) ABSTRACT

A vehicle control device including a motion condition detector detecting motion conditions including a rotational motion and a longitudinal acceleration of a vehicle on which a load is to be loaded, a wheel load acquisition unit acquiring wheel loads of wheels, a loading state acquisition unit acquiring a loading state of the load loaded on the vehicle, an inertia value calculator calculating an inertia value including principal axes of inertia about a center of gravity of the vehicle with the load included, based on the acquired loading state, and a controller performing overturning prevention control that suppresses an increase in difference between the wheel loads of front and rear wheels of the vehicle, using the acquired wheel loads of the wheels, the inertia value, and detection values of the motion conditions.

8 Claims, 19 Drawing Sheets

(51) Int. Cl.
*B66F 9/075* (2006.01)
*B66F 17/00* (2006.01)

(58) Field of Classification Search
CPC ..... B60W 2520/105; B60W 2520/125; B60W 2520/14; B60W 2520/16; B60W 2520/18; B60W 30/02; B60W 30/04; B60W 10/04; B66F 9/0755; B66F 17/003; B60T 8/17554

See application file for complete search history.

(56) References Cited

U.S. PATENT DOCUMENTS

| | | | | |
|---|---|---|---|---|
| 2010/0250073 A1* | 9/2010 | McCabe | ............... | B66F 17/003 |
| | | | | 701/50 |
| 2019/0047334 A1* | 2/2019 | Chidlow | ............... | B60C 23/004 |
| 2020/0071144 A1 | 3/2020 | Draayer et al. | | |

* cited by examiner

CENTER  LEFT SIDE

ACTING FORCE RELATING TO YAW MOMENT Nv (TOP VIEW)

VEHICLE CONTROL DEVICE AND METHOD FOR CONTROLLING VEHICLE

CROSS-REFERENCE TO RELATED APPLICATION

This application claims priority to Japanese Patent Application No. 2021-040319 filed on Mar. 12, 2021, and No. 2022-028502 filed on Feb. 25, 2022, the entire disclosures of which are incorporated herein by reference.

BACKGROUND ART

The present disclosure relates to a vehicle control device and a method of controlling vehicle, and specifically relates to a vehicle control device and a method of controlling a vehicle on which a load is loaded for performing overturning prevention control of a vehicle.

Conventionally, Japanese Patent No. 6282108 discloses a technique that combines a torque control amount with a motor torque instruction value to provide a final motor torque instruction value, the torque control amount being provided by the product of a control coefficient and a pitch angular acceleration, the control coefficient being set based on a relationship in a longitudinal position of a center of gravity according to a loading state of a forklift.

Japanese Patent No. 4747722 discloses a technique that calculates, for prevention of lateral overturning of a vehicle, braking forces to be distributed to respective wheels, using a two-wheel model of a vehicle during constant running that is not subject to acceleration/deceleration control as a reference turning model.

In Japanese Patent No. 6282108 above, a load is not always loaded at a position corresponding to a center of an axle of left and right wheels on forks, and the center of gravity of the load may deviate from a center axis of the vehicle. As a result, roll and yaw behaviors may affect a pitch behavior, and thus, there is the problem of precise control being not performed in consideration of center-of-gravity shifting in the longitudinal direction of the vehicle alone like in the conventional technique.

In Japanese Patent No. 4747722 above, if the vehicle decelerates in a state in which load shifting large enough for the vehicle to laterally overturn occurs, in the vehicle, a change in tire lateral force characteristic is large and a vehicle speed decrease occurs, and thus, there is a large discrepancy between the reference model having tire characteristics expressed under a constant vehicle speed and linear tire cornering power, and the motion of the vehicle. As a result, an output error between the model used for derivation of a control device and the vehicle cannot be expressed, and designing of a control device may result in failure to provide sufficient controllability.

The present disclosure, which has been made in light of the above-mentioned problems, is directed to providing a vehicle control device and a method of controlling a vehicle for properly performing overturning prevention control according to a loading state of a load.

SUMMARY

In accordance with an aspect of the present disclosure, there is provided a vehicle control device including a motion condition detector configured to detect motion conditions of a vehicle on which a load is to be loaded, the motion conditions including a rotational motion and a longitudinal acceleration of the vehicle, a wheel load acquisition unit configured to acquire wheel loads of wheels of the vehicle, a loading state acquisition unit configured to acquire a loading state of the load loaded on the vehicle, an inertia value calculator configured to calculate an inertia value including principal axes of inertia about a center of gravity of the vehicle with the load included, based on the acquired loading state, and a controller configured to perform overturning prevention control that suppresses an increase in difference between the wheel loads of front and rear wheels of the vehicle, using the acquired wheel loads of the wheels, the inertia value, and detection values of the motion conditions.

In accordance with another aspect of the present disclosure, there is provided a vehicle control device including a motion condition detector configured to detect motion conditions of a vehicle on which a load is to be loaded thereon, the motion conditions including a rotational motion and a lateral acceleration of the vehicle, a wheel load acquisition unit configured to acquire wheel loads of wheels of the vehicle, a loading state acquisition unit configured to acquire a loading state of the load loaded on the vehicle, an inertia value calculator configured to calculate an inertia value including principal axes of inertia about a center of gravity of the vehicle with the load included, based on the acquired loading state, and a controller configured to perform overturning prevention control that suppresses an increase in difference between the wheel loads of left and right wheels of the vehicle, using the acquired wheel loads of the wheels, the inertia value, and detection values of the motion conditions.

In accordance with another aspect of the present disclosure, there is provided a method for controlling a vehicle including detecting motion conditions of a vehicle on which a load is to be loaded, the motion conditions including a rotational motion and a longitudinal acceleration of the vehicle, acquiring wheel loads of wheels of the vehicle, acquiring a loading state of the load loaded on the vehicle, calculating an inertia value including principal axes of inertia about a center of gravity of the vehicle with the load included, based on the acquired loading state, and performing overturning prevention control that curbs an increase in difference between the wheel loads of front and rear wheels of the vehicle, using the acquired wheel loads of the wheels, the inertia value, and detection values of the motion conditions.

In accordance with another aspect of the present disclosure, there is provided a method for controlling a vehicle including detecting motion conditions of a vehicle on which a load is to be loaded, the motion conditions including a rotational motion and a lateral acceleration of the vehicle, acquiring wheel loads of wheels of the vehicle, acquiring a loading state of the load loaded on the vehicle, calculating an inertia value including principal axes of inertia about a center of gravity of the vehicle with the load included, based on the acquired loading state, and performing overturning prevention control that curbs an increase in difference between the wheel loads of left and right wheels of the vehicle, using the acquired wheel loads of the wheels, the inertia value, and detection values of the motion conditions.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the embodiments together with the accompanying drawings in which.

DETAILED DESCRIPTION OF THE EMBODIMENTS

Figure 1A:
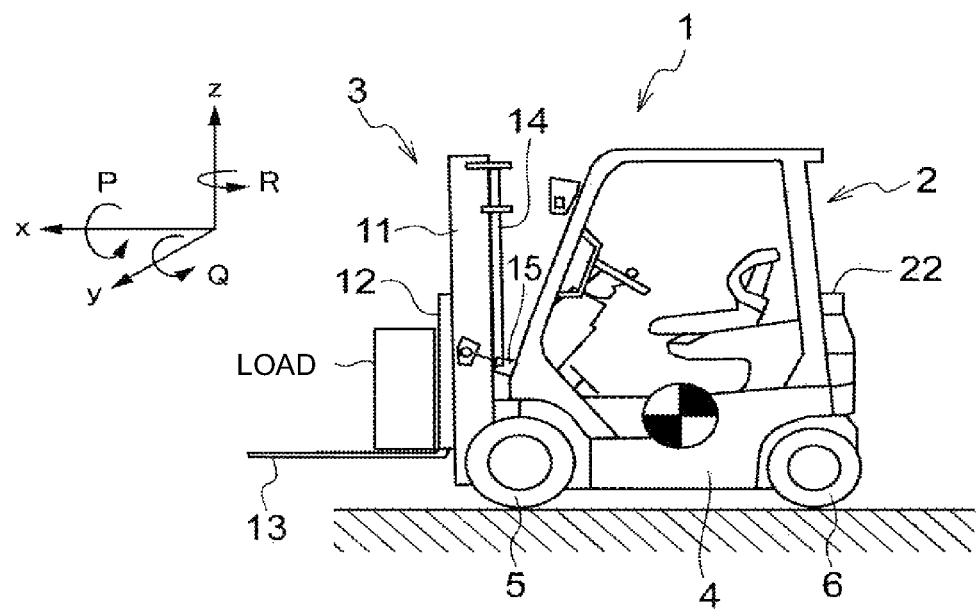
FIGS. 1A and 1B are side views each illustrating a configuration of a forklift according to a first embodiment of the present disclosure.

Embodiments of the present disclosure will be described in detail below with reference to the drawings. Each of the present embodiments will be described taking a case where the present disclosure is applied to a vehicle control device mounted in a forklift, the vehicle control device performing overturning prevention control, as an example.

First Embodiment

<Configuration of Vehicle Control Device>

FIG. 1 is a side view illustrating a forklift, which is a vehicle including a vehicle control device according to a first embodiment of the present disclosure. In FIG. 1, a forklift 1 according to the present embodiment is a counterbalance forklift. The forklift 1 includes a travelling device 2, and a loading device 3 disposed on the front side of the travelling device 2 and configured to lift a load up and down.

The travelling device 2 includes a vehicle body 4, front wheels 5, which are a pair of drive wheels disposed in a front portion of the vehicle body 4, rear wheels 6, which are a pair of steering wheels disposed in a rear portion of the vehicle body 4, and a drive motor (illustration omitted) configured to rotate the front wheels 5.

Figure 1B:
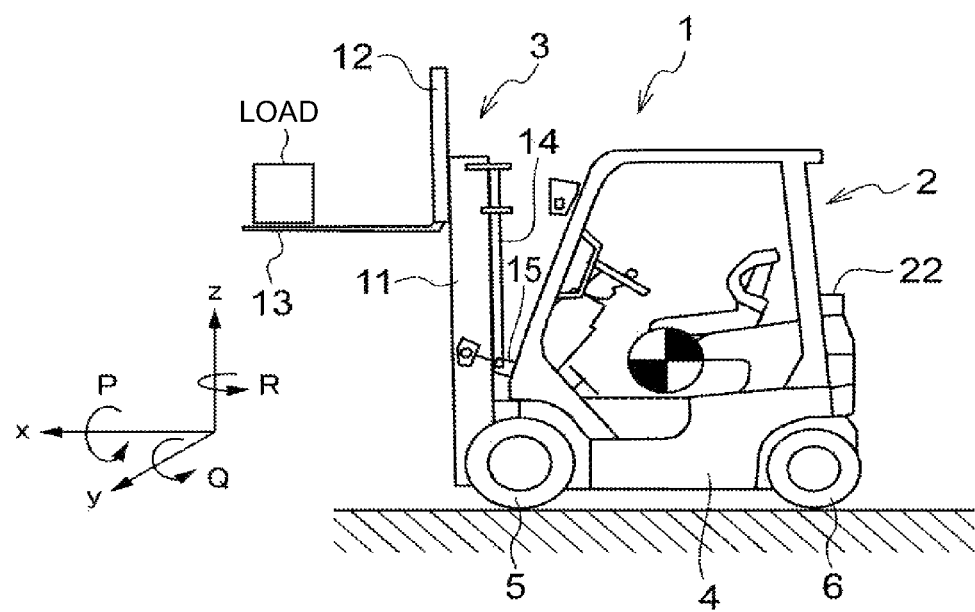

The loading device 3 is connected to a front end portion of the vehicle body 4. The loading device 3 includes a mast 11 provided in a standing manner at the front end portion of the vehicle body 4, a pair of forks 13, which is attached to the mast 11 via a lift bracket 12 and on which a load is to be loaded, a lift cylinder 14 configured to move the forks 13 up and down, and a tilt cylinder 15 configured to tilt the mast 11. As illustrated in FIGS. 1A and 1B, the forklift 1 is capable of lifting loads having different weights up to various lifting heights. Also, the forklift 1 is capable of lifting loads having different weights up at longitudinally different positions on the forks 13.

Figure 2:
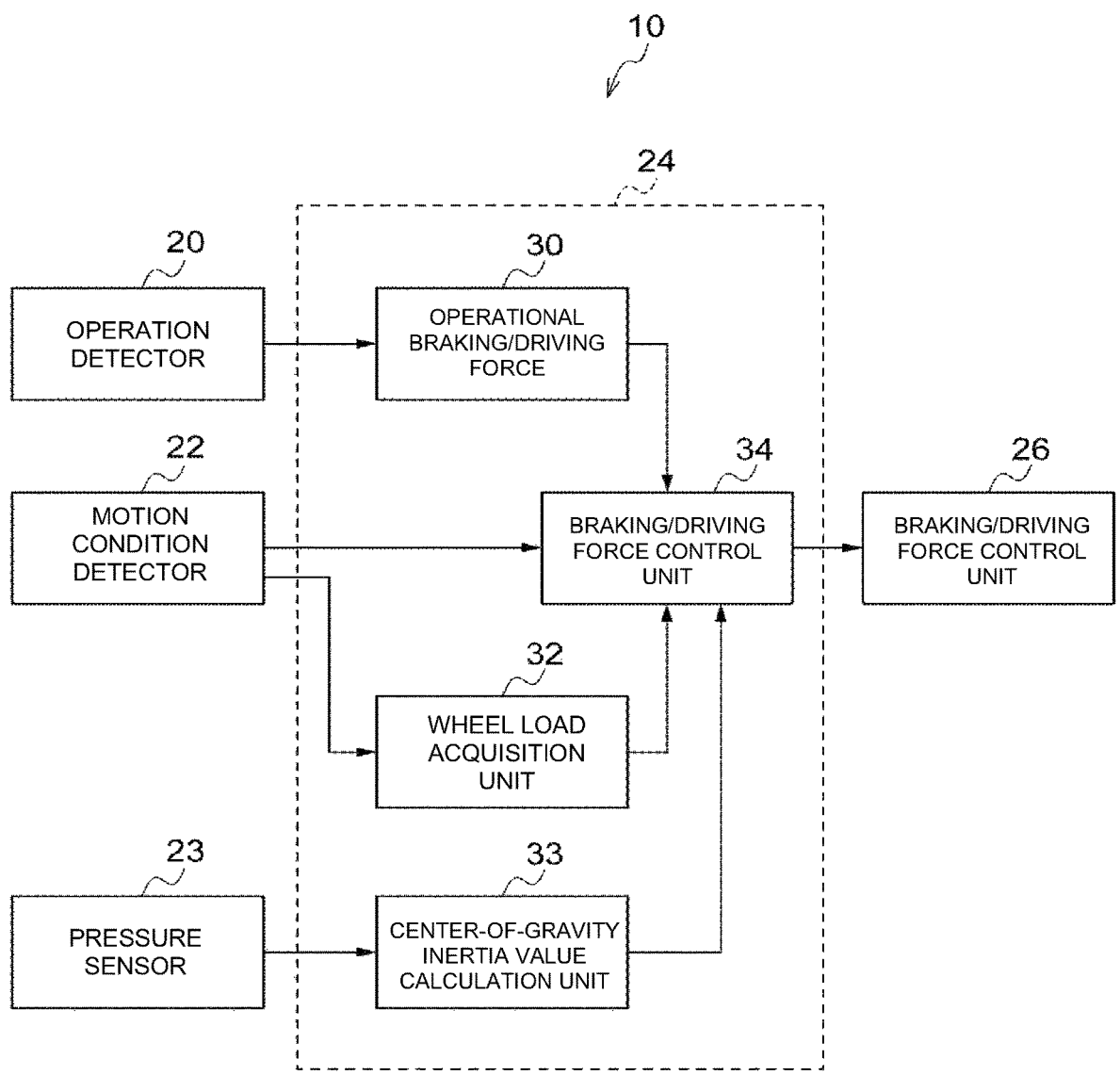
FIG. 2 is a schematic diagram illustrating a configuration of a vehicle control device according to the first embodiment of the present disclosure.

FIG. 2 is a block diagram of a configuration of a vehicle control device according to the embodiment of the present disclosure. In FIG. 2, a vehicle control device 10 is mounted in the forklift 1. The vehicle control device 10 includes an operation detector 20, a motion condition detector 22, a pressure sensor 23, a computer 24 and a braking/driving force generator 26.

The computer 24 is configured by a computer including a CPU, a RAM and a ROM that stores programs including a program for executing a later-described overturning prevention control processing routine and various data. As illustrated in FIG. 2, the computer 24 functionally includes an operational braking/driving force acquisition unit 30, a wheel load acquisition unit 32, a center-of-gravity inertia value calculation unit 33 and a braking/driving force control unit 34.

The operation detector 20 detects amounts of operation of a steering, an accelerator and a brake (including a regenerative brake) by a driver.

The motion condition detector 22 detects at least a roll angular velocity P, a pitch angular velocity Q, a yaw angular velocity R and a longitudinal acceleration Gx as motions conditions of the vehicle, using an IMU (inertial measurement unit).

The pressure sensor 23 is, for example, a sheet-like sensor provided on entire loading surfaces, on which a load is loaded, of the forks 13, and detects a pressure imposed on each of positions in the loading surfaces and outputs detection values.

The operational braking/driving force acquisition unit 30 acquires control amounts $F_{DRV(i)}$ for braking forces and driving forces of the drive wheels of the vehicle based on the driver's operation. More specifically, the operational braking/driving force acquisition unit 30 acquires control amounts $F_{DRV(i)}$ for braking forces or driving forces of the left and right wheels, the control amount $F_{DRV(i)}$ being determined based on amounts of operation of the steering, the accelerator and the brake (including the regenerative brake) by the driver. However, suffix i is an identifier of each of the wheels (a front right wheel, a front left wheel, a rear right wheel and a rear left wheel).

The wheel load acquisition unit 32 detects (acquires) wheel loads of the wheels of the forklift 1. A method for detection of a wheel load is, e.g., a method in which a wheel load is estimated based on detection values from the motion condition detector 22 and vehicle specifications such as a center-of-gravity position, a vehicle mass and inertia, or a method in which a wheel load is measured using a load cell.

The center-of-gravity inertia value calculation unit 33 acquires a loading state of a load loaded on the forklift 1, and based on the acquired loading state, calculates an inertia value including principal axes of inertia about the center of gravity of the vehicle with the load included. It is noted that the center-of-gravity inertia value calculation unit 33 serves as a loading state acquisition device that acquire the loading sate of the load, and as an inertia value calculator unit that calculates the inertia value including the principal axes of inertia about the center of gravity of the vehicle with the load included.

More specifically, the center-of-gravity inertia value calculation unit 33 receives the detection values from the pressure sensor 23 and converts the detection values each indicating a pressure into values each indicating weight to acquire weight $M_\alpha$ of the load loaded on the fork 13. The center-of-gravity inertia value calculation unit 33 receives the detection values from the pressure sensor 23, and acquires a position at which a largest detection value on the loading surfaces of the forks 13 has been detected, as a position of the load loaded on the fork 13. The center-of-gravity inertia value calculation unit 33 receives a detection value outputted from an encoder provided on the lift cylinder 14, and calculates a height of the forks 13 relative to a reference position (for example, a lowermost portion) from a rotational angle of a lifting hydraulic motor, the rotational angle being indicated by the detection value, and acquires the height as a lift height.

The center-of-gravity inertia value calculation unit 33 totals the acquired weight $M_\alpha$ of the load and weight $M_\beta$ of the vehicle stored as a vehicle specification, to calculate weight $M_{all}$ of the entire forklift 1 with the load included. Also, based on acquired information, the center-of-gravity inertia value calculation unit 33 calculates a position of the center of gravity of the load. As a method for calculation of a position of the center of gravity of a load, for example, a method described in Japanese Patent Application Publication No. 2020-93741 is used.

Also, the center-of-gravity inertia value calculation unit 33 calculates a position of the center of gravity $CG_{all}$ of the entire forklift 1 and positions of the centers of gravity of component parts j, based on the position of the center of gravity of the load and structures of the component parts stored as vehicle specifications. Then, the center-of-gravity inertia value calculation unit 33 calculates an inertia tensor $J_{all}$ as described below.

Figure 6:
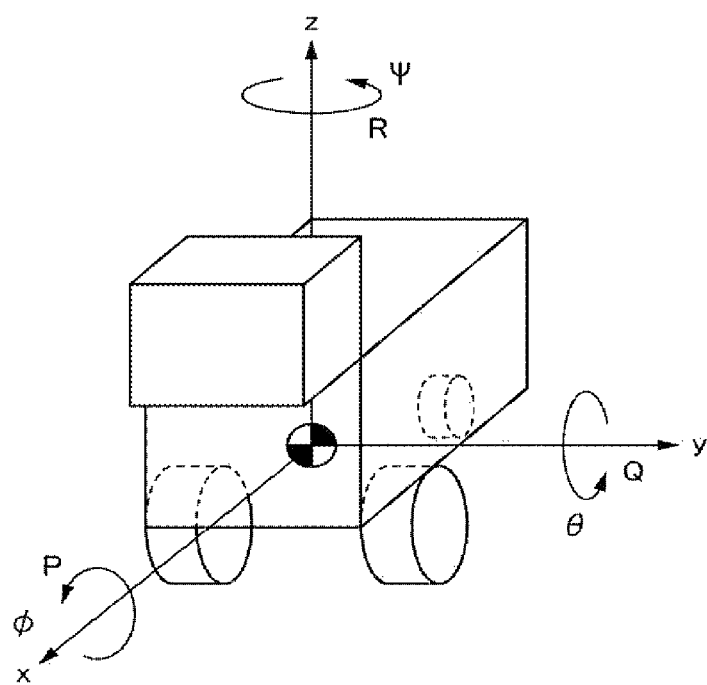
FIG. 6 is a diagram for describing a six-degrees-of-freedom model.

First, in order to deal with a difference in loading state such as one illustrated in FIGS. 1A and 1B, a vehicle motion is described using a six-degrees-of-freedom model indicated in FIG. 6 and expressions (1) to (3). An overturning prevention control amount is calculated using expression (1). "$J_{all}$" in expression (1) is an inertia tensor formed of principal axis inertias and the products of inertia.

$$\begin{bmatrix} \dot{P} \\ \dot{Q} \\ \dot{R} \end{bmatrix} = J_{all}^{-1} \left( -\begin{bmatrix} 0 & -R & Q \\ R & 0 & -P \\ -Q & P & 0 \end{bmatrix} J_{all} \begin{bmatrix} P \\ Q \\ R \end{bmatrix} + \begin{bmatrix} L_v \\ M_v \\ N_v \end{bmatrix} \right) \quad (1)$$

$$\begin{bmatrix} \dot{U} \\ \dot{V} \\ \dot{W} \end{bmatrix} = -\begin{bmatrix} 0 & -R & Q \\ R & 0 & -P \\ -Q & P & 0 \end{bmatrix} \begin{bmatrix} U \\ V \\ W \end{bmatrix} + g \begin{bmatrix} -\sin\theta \\ \sin\phi\cos\theta \\ \cos\phi\cos\theta \end{bmatrix} + \frac{1}{M_{all}} \begin{bmatrix} X_v \\ Y_v \\ Z_v \end{bmatrix} \quad (2)$$

$$\begin{bmatrix} \dot{\phi} \\ \dot{\theta} \\ \dot{\psi} \end{bmatrix} = \begin{bmatrix} 1 & \sin\phi\tan\theta & \cos\phi\tan\theta \\ 0 & \cos\phi & -\sin\phi \\ 0 & \sin\phi/\cos\theta & \cos\phi/\cos\theta \end{bmatrix} \begin{bmatrix} P \\ Q \\ R \end{bmatrix} \quad (3)$$

The symbols in expressions (1) to (3) above are as follows.

| | |
|---|---|
| P, Q, R: roll, pitch or yaw angular velocity | [rad/s] |
| $L_v$, $M_v$, $N_v$: roll, pitch or yaw moment | [Nm] |
| U, V, W: x, y or z-direction velocity in vehicle coordinate system | [m/s] |
| $\phi$, $\theta$, $\psi$: posture angle in vehicle coordinate system relative to ground coordinate system | [rad] |
| $X_v$, $Y_v$, $Z_v$: longitudinal, lateral or vertical force acting on vehicle | [N] |
| $J_{all}$: inertia tensor formed of x, y and x-axis direction principal axis inertias and products of inertia | [kg · m²] |
| $M_{all}$: total mass of vehicle and load masses | [kg] |

Figure 7A:
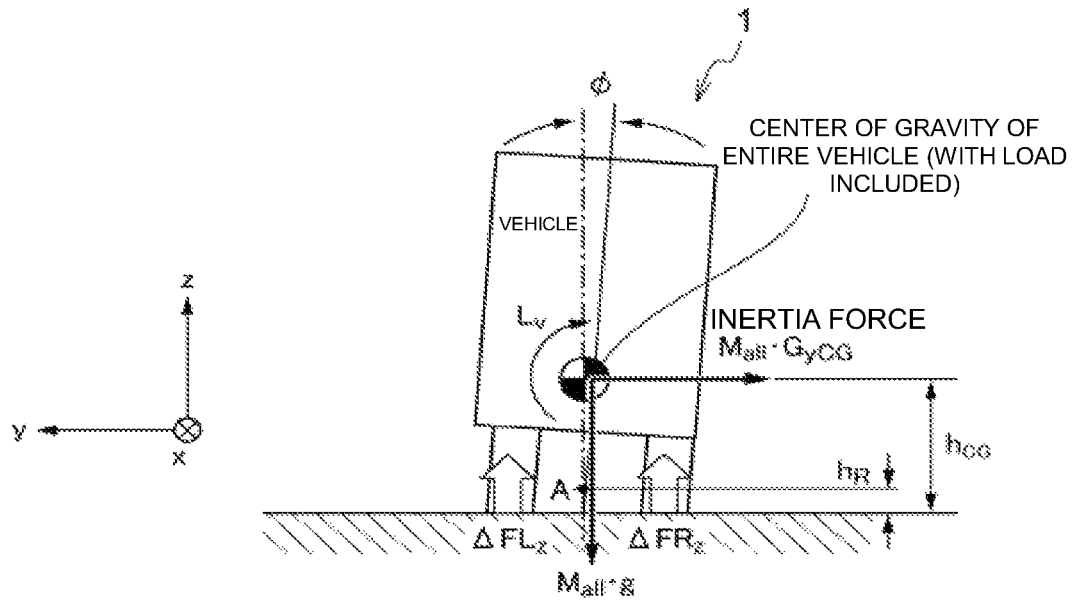
FIG. 7A is a front view of the forklift for describing an acting force relating to a roll moment.
Figure 7B:
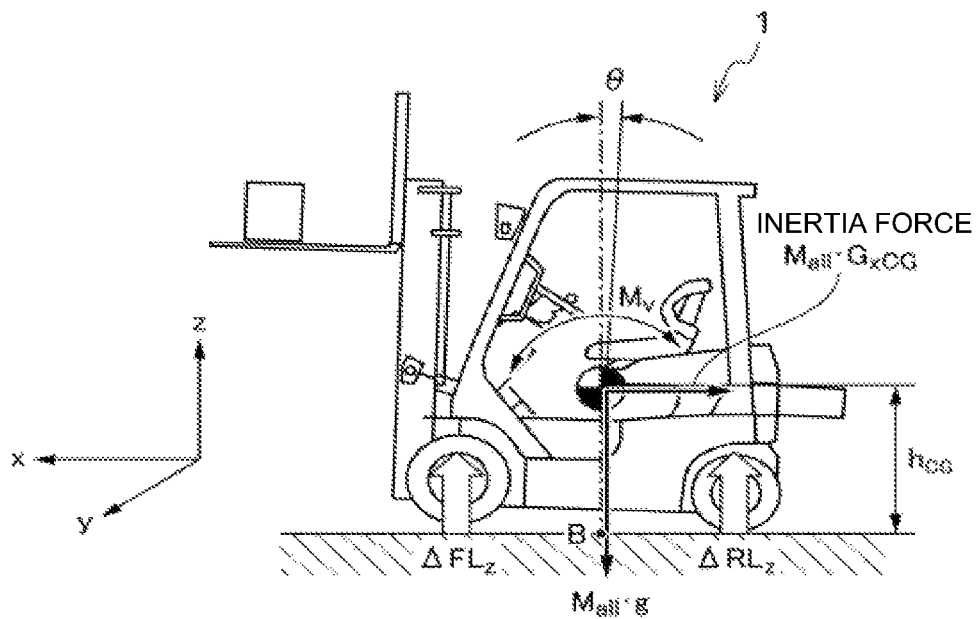
FIG. 7B is a side view of the forklift for describing an acting force relating to a pitch moment.
Figure 8:
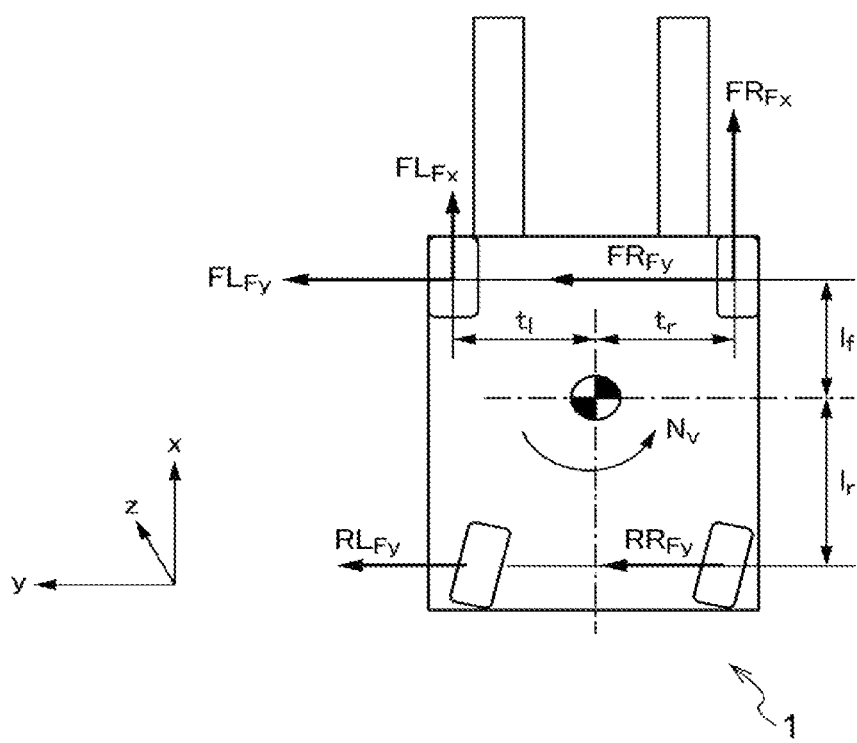
FIG. 8 is a top view of the forklift for describing an acting force relating to a yaw moment.

FIGS. 7A, 7B and 8 and Table 1 indicate acting forces related to moments $L_v$, $M_v$, $N_v$ in expression (1). Point A in FIG. 7A is a roll rotation center and is a point at which a vertical line extending through the center of gravity of the entire vehicle at a stop and a roll axis intersect. Point B in FIG. 7B is a pitch rotation center and is a point at which the vertical line extending through the center of gravity of the entire vehicle at a stop and a ground surface intersect.

TABLE 1

| | |
|---|---|
| $M_{all}$ | Total mass of load and vehicle masses |
| $G_{xCG}$, $G_{yCG}$ | Longitudinal and lateral accelerations of center of gravity of entire vehicle |
| g | Gravitational acceleration |
| $\Delta FL_z$, $\Delta FR_z$, $\Delta RL_z$, $\Delta RR_z$ | Wheel load variations of wheels |
| $FL_{Fx}$, $FR_{Fx}$ | Braking/driving forces of left and right front wheels |
| $FL_{Fy}$, $FR_{Fy}$, $RL_{Fy}$, $RR_{Fy}$ | Tire lateral forces of wheels |
| $h_{CG}$, $h_R$ | Center-of-gravity height, roll center height |
| $t_f$, $t_r$ | Distances between left and right front wheels and center of gravity |
| $l_f$, $l_r$ | Distances between front and rear wheels and center of gravity |

Figure 9:
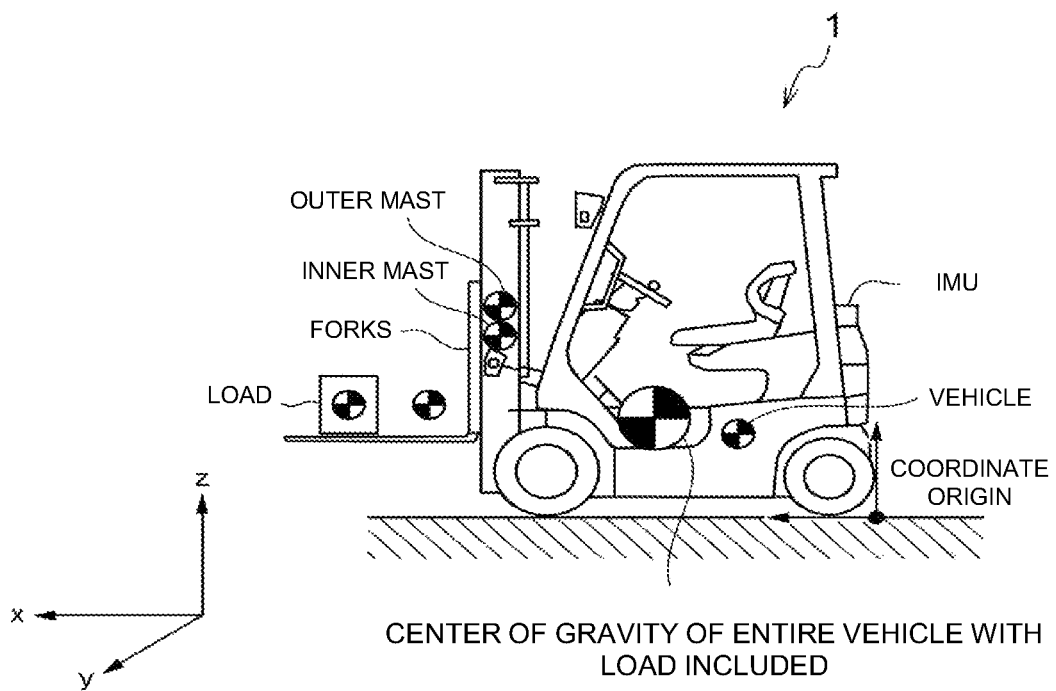
FIG. 9 is a diagram for describing centers of gravity of components and a center of gravity of the entire vehicle.

Setting of the inertia tensor $J_{all}$ will be described with reference to FIG. 9. FIG. 9 illustrates an overview of components of the forklift 1 (with a load included) and indicates centers of gravity of the components, the center of gravity of the entire vehicle and a coordinate origin.

A configuration of the inertia tensor Jal is indicated in expression (4). Each of the diagonal elements is a principal axis inertia and each of the off-diagonal elements is a product of inertia, and a difference in loading state is expressed by expression (4).

$$J_{all} = \begin{bmatrix} J_{xx} & J_{xy} & J_{xz} \\ J_{xy} & J_{yy} & J_{yz} \\ J_{xz} & J_{yz} & J_{zz} \end{bmatrix} = \qquad (4)$$

$$\begin{bmatrix} \sum_{j=1}^{N} m_j \cdot (\Delta y_j^2 + \Delta z_j^2) + J_A & -\sum_{j=1}^{N} m_j \cdot (\Delta x_j \cdot \Delta y_j) & -\sum_{j=1}^{N} m_j \cdot (\Delta x_j \cdot \Delta z_j) \\ -\sum_{j=1}^{N} m_j \cdot (\Delta x_j \cdot \Delta y_j) & \sum_{j=1}^{N} m_j \cdot (x_j^2 + \Delta z_j^2) + J_B & -\sum_{j=1}^{N} m_j \cdot (\Delta y_j \cdot \Delta z_j) \\ -\sum_{j=1}^{N} m_j \cdot (\Delta x_j \cdot \Delta z_j) & -\sum_{j=1}^{N} m_j \cdot (\Delta y_j \cdot \Delta z_j) & \sum_{j=1}^{N} m_j \cdot (\Delta x_j^2 + \Delta y_j^2) \end{bmatrix}$$

In expression (4), suffix "j" denotes each component and N denotes the total number of components. Where $CG_{all}$ is the center of gravity of the entire vehicle, a position $CG_{all}$ ($x_{CG}$, $y_{CG}$, $z_{CG}$) is calculated from masses and the center-of-gravity positions of the components illustrated in FIG. 9. Each of terms $\Delta_x$, $\Delta_y$, $\Delta_z$ in $J_{all}$ in expression (4) is a difference of a position between $CG_{all}$ and a center of gravity of a component; for example, $\Delta x_j$ is calculated according to expression (5) (the same applies to $\Delta y_j$ and $\Delta_z$).

$$\Delta x_j = x_j - x_{CG} \qquad (5)$$

JA and JB in expression (4) are correction values for inertia as viewed from point A and point B in FIG. 7, respectively, and are represented by expressions (6) and (7), respectively.

$$J_A = M_{all} \cdot (h_{CG} - h_R)^2 \qquad (6)$$

$$J_B = M_{all} \cdot h_{CG}^2 \qquad (7)$$

As described above, the center-of-gravity inertia value calculation unit 33 calculates axis-direction differences ($\Delta x_j$, $\Delta y_j$, $\Delta z_j$) between the position of the center of gravity $CG_{all}$ of the entire vehicle, and the position of the center of gravity of each component part j, according to an expression that is similar to expression (5). Also, the center-of-gravity inertia value calculation unit 33 calculates an inertia tensor $J_{all}$ according to expression (4), using the calculated $\Delta x_j$, $\Delta y_j$, $\Delta z_j$ and the weights $m_j$ of the component parts j stored as the vehicle specifications.

Additionally, the center-of-gravity inertia value calculation unit 33 sets a position in the z-axis direction ($z_{all}$) as $h_{CG}$, in the calculated position of the center of gravity $CG_{all}$ of the entire forklift 1.

The braking/driving force control unit 34 performs overturning prevention control that curbs a decrease in wheel load of the wheels of the forklift 1.

Figure 3:
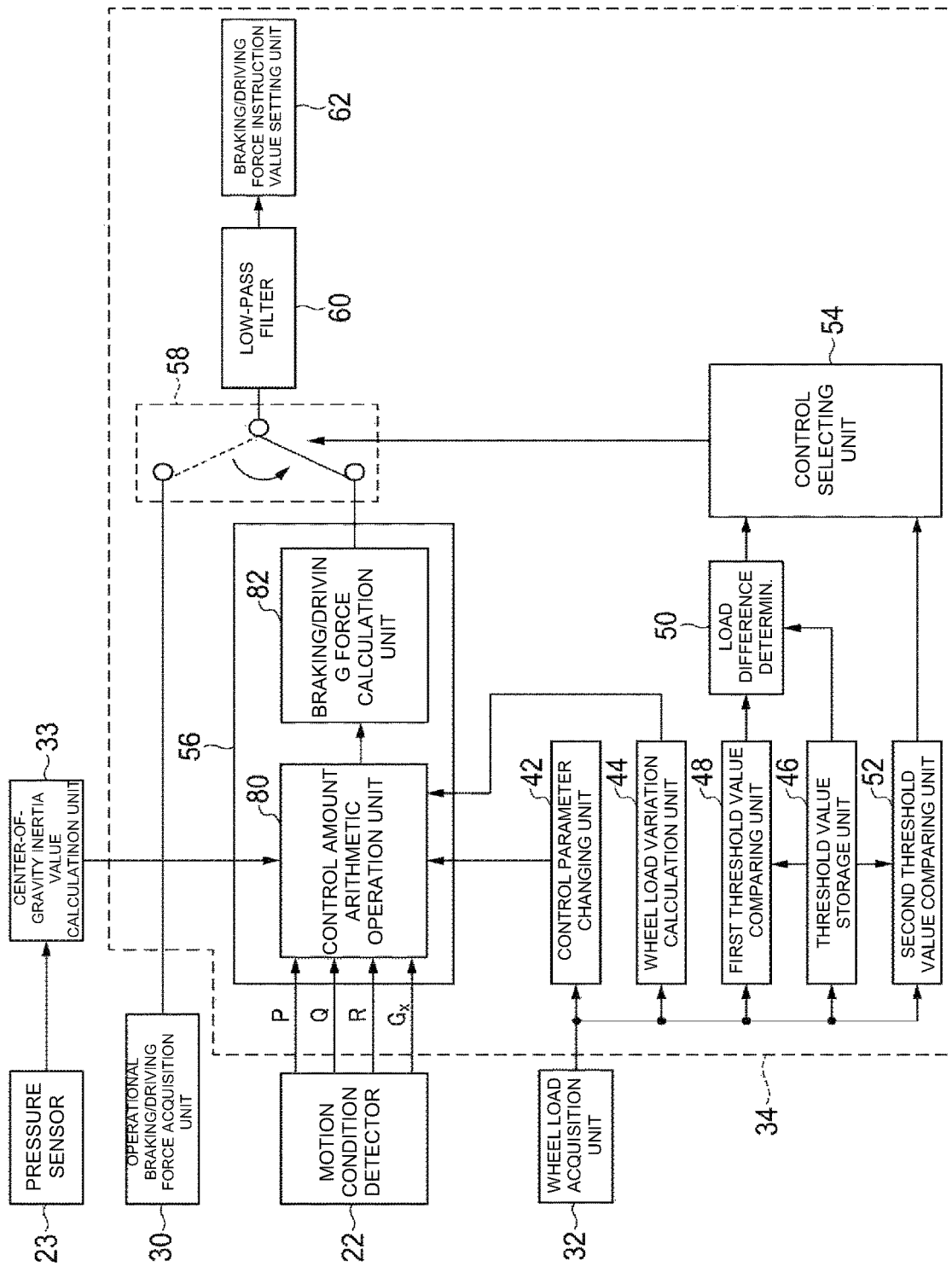
FIG. 3 is a block diagram illustrating a configuration of a braking/driving force control unit of the vehicle control device according to the first embodiment of the present disclosure.

More specifically, as illustrated in FIG. 3, the braking/driving force control unit 34 includes a control parameter changing unit 42, a wheel load variation calculation unit 44, a threshold value storage unit 46, a first threshold value comparing unit 48, a control selecting unit 54, a second threshold value comparing unit 52, a control selecting unit 54, a control unit 56, a control amount switching unit 58, a low-pass filter 60 and a braking/driving force instruction value setting unit 62. Note that each of the control selecting unit 54, the control unit 56, the control amount switching unit 58 and the braking/driving force instruction value setting unit 62 corresponds to a controller of the present disclosure.

The control parameter changing unit 42 acquires the wheel loads of the wheels in a state in which the forklift 1 is at a stop and differences between the wheel loads of the left and right wheels. The control parameter changing unit 42 changes, e.g., a center-of-gravity height and an inertia value for a later-described control amount arithmetic operation unit 80, according to the acquired wheel loads of the wheels in a state in which the forklift 1 is at a stop and the acquired differences between the wheel loads of the left and right wheels.

The wheel load variation calculation unit 44 calculates a wheel load variation of each wheel.

The threshold value storage unit 46 acquires the wheel loads of the wheels in a state in which the forklift 1 is at a stop, that is, the forklift 1 is not travelling, and the differences between the wheel loads of the left and right wheels. The threshold value storage unit 46 sets a first threshold value and a second threshold value for the wheel load of each wheel, a third threshold value for the difference between the wheel loads of the front left and right wheels, and a fourth threshold value for the difference between the wheel loads of the rear left and right wheels according to the acquired wheel loads of the wheels in a state in which the forklift 1 is at a stop and the acquired differences between the wheel loads of the left and right wheels, and stores the threshold values. The third and fourth threshold values correspond to a difference threshold.

Here, each first threshold value is a start determination threshold value for determining a start of overturning prevention control for the relevant wheel, and each second threshold value is an end determination threshold value for determining an end of overturning prevention control for the relevant wheel. Each second threshold value is set to a value that is larger than the relevant first threshold value.

Figure 4A:
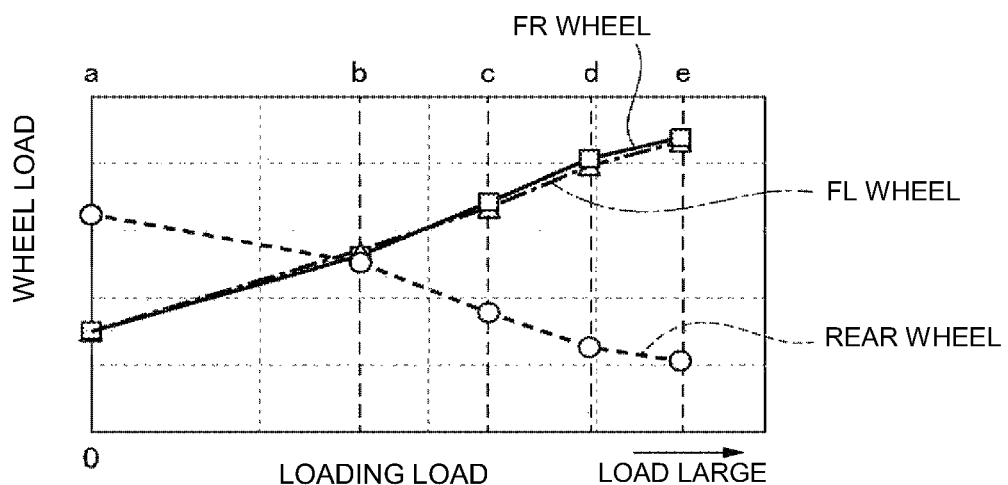
FIG. 4A is a graph indicating a relationship between a loading load and wheel loads.
Figure 4B:
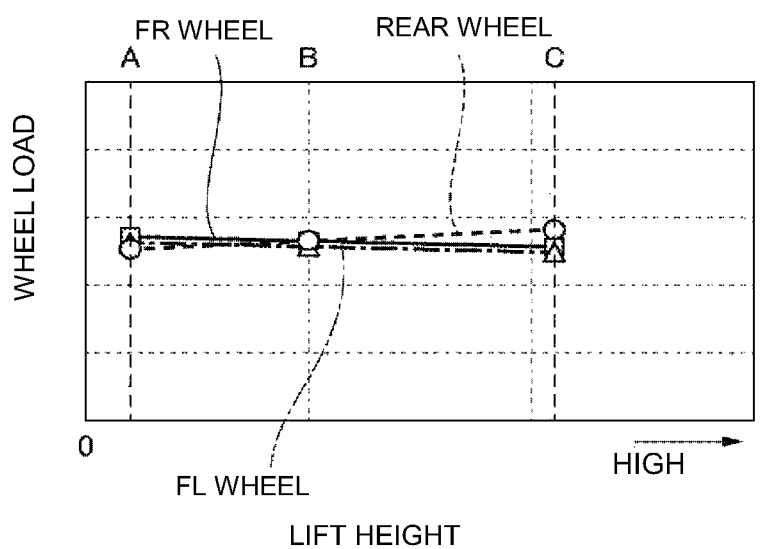
FIG. 4B is a graph indicating a relationship between a lift height and wheel loads and FIG. 4C is a graph indicating a relationship between a loading position and wheel loads.
Figure 4C:
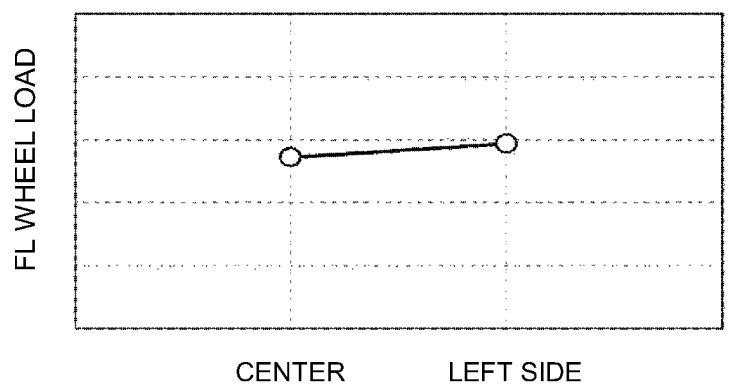

In overturning prevention control, setting of the first to fourth threshold values for the wheel loads that vary according to the loading state is important. For explanation of this point, a wheel load difference depending on the loading load, the lift height and the lateral loading position on the forks are indicated in FIGS. 4A, 4B and 4C. FIGS. 4A, 4B and 4C each illustrate an example of measurement of loads in a three-wheel forklift.

Figures 5A, 5B:
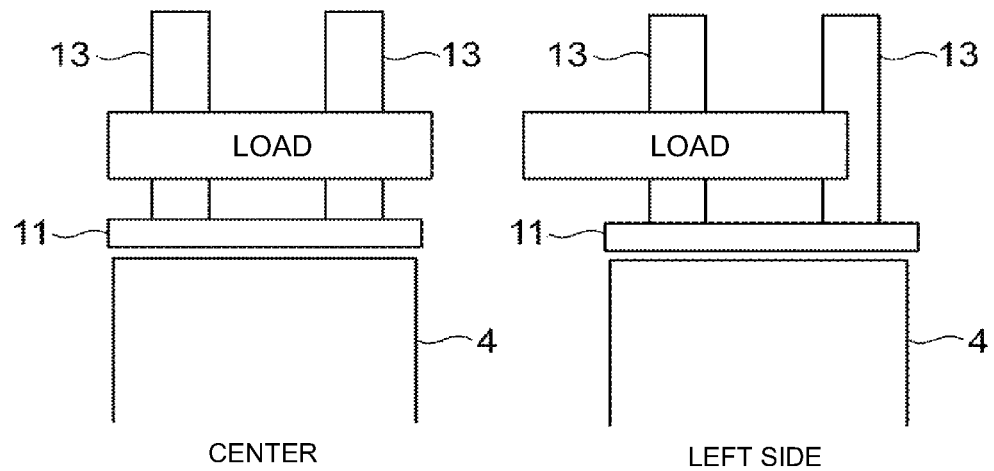
FIG. 5A is a top view in a case where a load is loaded at a center position and FIG. 5B is a top view in a case where a load is loaded at a left-side position.

FIG. 4A indicates a relationship between a loading load and wheel loads of a front right wheel (FR wheel), a front left wheel (FL wheel) and a rear wheel. FIG. 4A indicates an example in which the lift height is the lift height "A" in FIG. 4B and the loading position is a center position as illustrated in FIG. 5A.

FIG. 4B indicates a relationship between a lift height and wheel loads of the front right wheel (FR wheel), the front left wheel (FL wheel) and the rear wheel. FIG. 4B indicates an example in which the loading load is the loading load "b" in FIG. 4A and the loading position is the center position as illustrated in FIG. 5A.

FIG. 4C indicates a relationship between the loading position on the forks (see FIGS. 5A and 5B) and a wheel load of the front left wheel (FL wheel). FIG. 4C illustrates an example in which the loading load is the loading load "c" in FIG. 4A and the lift height is the lift height "C" as illustrated in FIG. 4B.

As indicated in FIGS. 4A to 4C above, each of the wheel loads largely varies according to the loading state.

Therefore, the threshold value storage unit 46 sets the threshold values according to the wheel loads detected in a state where travelling of the forklift is stopped. For example, the threshold value storage unit 46 sets, for each wheel, 30% of a wheel load detection value of the wheel as the first threshold value for the wheel, 40% of the wheel load detection value of the wheel as the second threshold value for the wheel, and sets the third threshold value and the fourth threshold value to 30% of an average of the wheel loads of the front left and right wheels and the wheel loads of the rear left and right wheels.

The threshold value storage unit 46 stores the set first threshold values for each wheel, the set second threshold values for each wheel, the third threshold value and the fourth threshold value.

The first threshold value comparing unit 48 compares the wheel load detection value and the first threshold value for each wheel, and determines whether or not at least one wheel load detection value is smaller than the relevant first threshold value. If at least one wheel load detection value is smaller than the relevant first threshold value, a load difference determining unit 50 determines whether or not a difference between the loads of left and right wheels is smaller than the relevant threshold value, and if the difference between the loads of the left and right wheels is smaller than the relevant threshold value, the control selecting unit 54 starts longitudinal overturning prevention control.

Upon the first threshold value comparing unit 48 determining that at least one wheel load detection value is smaller than the relevant first threshold value, the control selecting unit 54 starts longitudinal overturning prevention control according to a result of comparison of the difference between the wheel loads of the front left and right wheels with the third threshold value or a result of comparison of the difference between the wheel loads of the rear left and right wheels with the fourth threshold value.

More specifically, if at least one wheel load detection value is smaller than the relevant first threshold value and the wheel load detection value that is smaller than the first threshold value is that of a front wheel and an absolute value of the difference between the wheel loads of the front left and right wheels is smaller than the third threshold value, the control selecting unit 54 starts longitudinal overturning prevention control that controls braking forces or driving forces of the drive wheels of the vehicle.

Also, if at least one wheel load detection value is smaller than the relevant first threshold value and the wheel load detection value that is smaller than the first threshold value is that of a rear wheel and an absolute value of the difference between the wheel loads of the rear left and right wheels is smaller than the fourth threshold value, the control selecting unit 54 starts longitudinal overturning prevention control that controls braking forces or driving forces of the drive wheels of the vehicle.

The second threshold value comparing unit 52 compares the wheel load detection value and the second threshold value for each wheel and determines whether or not all of the wheel load detection values are larger than the respective second threshold values. If all of the wheel load detection values are larger than the respective second threshold values, the overturning prevention control is terminated.

The control unit 56 calculates control amounts for controlling braking forces or driving forces of the drive wheels, using the inertia value including the principal axes of inertia about the center of gravity of the forklift 1 with the load included, the acquired wheel loads of the wheels, and the detection values of the motion conditions.

More specifically, the control unit 56 includes a control amount arithmetic operation unit 80 and a braking/driving force calculation unit 82.

The control amount arithmetic operation unit 80 calculates a pitch moment control amount PM, using the inertia value including the principal axes of inertia about the center of gravity of the forklift 1 with the load included, the acquired wheel loads of the wheels, and the detection values of the motion conditions.

Here, a principle for calculating a pitch moment control amount PM will be described.

A procedure for calculation of a pitch moment Mv that curbs a pitch angular acceleration $\dot{Q}$ will be described below. According to FIG. 7B, the pitch moment Mv is represented as a moment about $CG_{all}$ by expression (8).

$$M_V = -M_{all} \cdot G_{xCG} \cdot h_{CG} - (\Delta FL_z + \Delta FR_z) \cdot l_f + (\Delta RL_z + \Delta RR_z) \cdot l_r + PM \qquad (8)$$

Expression (8) is represented using a moment according to a longitudinal inertia force, a moment according to a wheel load variation, and a control moment PM for longitudinal overturning prevention. A moment ($=M_{all} \cdot g \cdot h_{CG} \cdot \sin\theta$, where g is a gravity acceleration) generated by center-of-gravity shifting in the x-axis direction according to pitching is omitted, because θ is a small value and does not provide a longitudinal overturning state in which wheels are lifted up is not provided. Where an IMU (inertial measurement unit) is mounted at an arbitrary position on the vehicle, for $G_{xCG}$, a value converted into an acceleration at the position of the center of gravity based on the later-described expression is used.

The following expression is obtained by substituting expressions (4) and (8) into the second row of expression (1) and expansion of the resulting expression.

$$J_{xy} \cdot \dot{P} + J_{yy} \cdot \dot{Q} + J_{yz} \cdot \dot{R} = (-J_{xx} \cdot R + J_{xz} \cdot P) \cdot P + (-J_{xy} \cdot R + J_{yz} \cdot P) \cdot Q + (-J_{xz} \cdot R + J_{zz} \cdot P) \cdot R - M_{all} \cdot G_{xCG} \cdot h_{CG} - (\Delta FL_z + \Delta FR_z) \cdot l_f + (\Delta RL_z + \Delta RR_z) \cdot l_r + PM \qquad (9)$$

PM that makes a pitch angular acceleration $\dot{Q}$ zero is obtained by the following expression, by transformation of expression (9) with $J_{yy} \cdot \dot{Q}$ on the left side of expression (9) as zero.

$$PM = J_{xy} \cdot \dot{P} + J_{yz} \cdot \dot{R} - [(-J_{xx} \cdot R + J_{xz} \cdot P) \cdot P + (-J_{xy} \cdot R + J_{yz} \cdot P) \cdot Q + (-J_{xz} \cdot R + J_{zz} \cdot P) \cdot R] + M_{all} \cdot G_{xCG} \cdot h_{CG} + (\Delta FL_z + \Delta FR_z) \cdot l_f - (\Delta RL_z + \Delta RR_z) \cdot l_r \qquad (10)$$

Note that a variable X with an overdot in an expression is denoted as Ẋ in the specification.

In order to curb a pitch motion, a sign is provided to PM obtained by expression (10), as the following expression.

$$\overline{PM} = -PM \qquad (11)$$

A method for converting an acceleration ($G_{xIMU}$, $G_{yIMU}$, $G_{zIMU}$) measured by the IMU at the arbitrary position as mentioned above into an acceleration ($G_{xCG}$, $G_{yCG}$, $G_{zCG}$) at the center of gravity position will be described. Expressions (12) to (17) are expressions for the conversion. In each of the expressions, 'x' represents a cross product.

$$\frac{d^2 R_{CG}}{dt^2} = \frac{d^2 r_{IMU}}{dt^2} + \left[\frac{d\omega^T}{dt} \times r\right]^T + \left(\omega^T \times (\omega^T \times r)\right)^T \qquad (12)$$

$$\frac{d^2 R_{CG}}{dt^2} = (G_{xCG} \quad G_{yCG} \quad G_{zCG})^T \qquad (13)$$

$$\frac{d^2 R_{IMU}}{dt^2} = (G_{xIMU} \quad G_{yIMU} \quad G_{zIMU})^T \qquad (14)$$

$$\omega = (P \quad Q \quad R)^T \qquad (15)$$

$$\frac{d\omega}{dt} = (\dot{P} \quad \dot{Q} \quad \dot{R})^T \qquad (16)$$

$$r = (\Delta x_{CG} \quad \Delta y_{CG} \quad \Delta z_{CG}) \qquad (17)$$

-continued $$\Delta x_{CG} = x_{CG} - x_{IMU} \quad (18)$$

$$\Delta y_{CG} = y_{CG} - y_{IMU} \quad (19)$$

$$\Delta z_{CG} = z_{CG} - z_{IMU} \quad (20)$$

Here, $x_{IMU}$, $y_{IMU}$, $z_{IMU}$ denote the positions of the IMU and T denotes transposition.

As with the above-described principle, the control amount arithmetic operation unit 80 calculates the pitch moment control amount PM according to expressions (10) and (11), using the inertia value including the principal axes of inertia about the center of gravity of the forklift 1 with the load included, the acquired wheel loads of the wheels and the detection values of the motion conditions.

Figure 10:
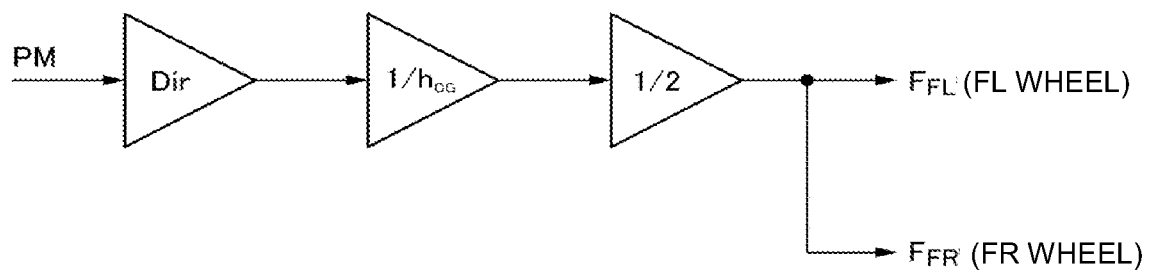
FIG. 10 is a diagram for describing processing by a braking/driving force calculator.

As illustrated in FIG. 10, the braking/driving force calculation unit 82 calculates control amounts $F_{FL}$, $F_{FR}$ for braking forces or driving forces of the front left and right wheels in such a manner as to obtain the pitch moment control amount PM. "Dir" in FIG. 10 is a flag indicating forward travelling or rearward travelling, in which '+1' denotes forward travelling and '−1' denotes rearward travelling. Also, the pitch control amount PM is converted into a tire braking/driving force by being divided by $h_{CG}$, and the tire braking/driving force is distributed into tire braking/driving forces of the left and right wheels by being further divided by 2.

If the longitudinal overturning prevention control is started, the control amount switching unit 58 outputs control amounts $F_{(i)}$ for braking forces or driving forces, which have been obtained by the control unit 56.

Also, if the longitudinal overturning prevention control is terminated, the control amount switching unit 58 outputs control amounts $F_{DRV(i)}$ for braking forces or driving forces, which have been obtained by the operational braking/driving force acquisition unit 30.

In order to curb an abrupt change in braking/driving force due to switching between longitudinal overturning prevention control being performed and not being performed, the low-pass filter 60 performs low-pass filtering.

The braking/driving force instruction value setting unit 62 sets the control amounts $F_{(i)}$ for braking forces or driving forces, which have been output by the low-pass filter 60, as instruction values $F_{x(i)}$ for braking forces or driving forces of the left and right wheels. The braking/driving force generator 26 generates the instruction values $F_{x(i)}$ for braking forces or driving forces of the left and right drive wheels.

<Operation of Vehicle Control Device>

Next, operation of the vehicle control device 10 according to the first embodiment will be described.

Figure 11:
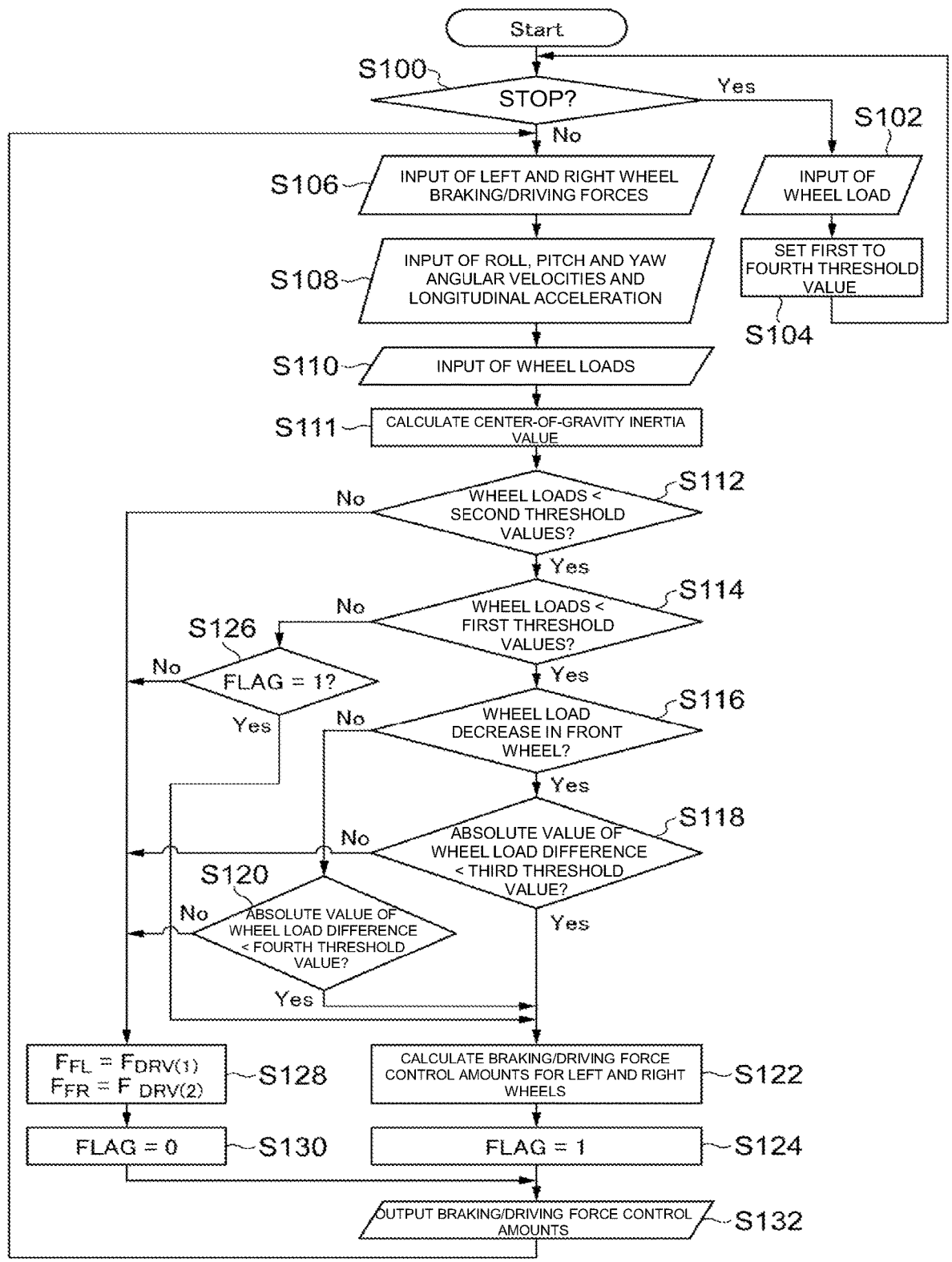
FIG. 11 is a flowchart illustrating a content of an overturning prevention control processing routine in the vehicle control device according to the first embodiment of the present disclosure.

Upon a power supply of the forklift 1 being turned on in a state in which a load is loaded on the forks 13 of the forklift 1 with the vehicle control device 10 mounted thereon, in the computer 24, the overturning prevention control processing routine illustrated in FIG. 11 is executed. Here, the description will be given taking a case where the forklift 1 is a front-wheel-drive forklift, as an example.

First, in step S100, whether or not the forklift 1 is at a stop is determined, and if it is determined that the forklift 1 is at a stop, the routine proceeds to step S102, and if it is determined that the forklift 1 is not at a stop, the routine proceeds to step S106.

In step S102, the wheel load acquisition unit 32 detects wheel loads of the wheels (i.e., the input of the wheel loads $F_{z(i)}$). The control parameter changing unit 42 and the threshold value storage unit 46 acquire wheel loads of the wheels in a state in which the forklift 1 is at a stop and differences between the wheel loads of the left and right wheels.

In step S104, the threshold value storage unit 46 sets a first threshold value and a second threshold value for the wheel load of each wheel, a third threshold value for the difference between the wheel loads of the front left and right wheels and a fourth threshold value for the difference between the wheel loads of the rear left and right wheels according to the wheel loads of the wheels in a state in which the forklift 1 is at a stop and the differences between the wheel loads of the left and right wheels, which have been acquired in step S102 above, and the routine returns to step S100.

In step S106, the operational braking/driving force acquisition unit 30 acquires control amounts $F_{DRV(i)}$ for braking forces and driving forces of the drive wheels, based on the driver's operation detected by the operation detector 20 (the input of left and right wheel braking/driving forces $F_{DRV(i)}$ based on instruction by driver's operation).

In step S108, the motion condition detector 22 detects a roll angular velocity P, a pitch angular velocity Q, a yaw angular velocity R and a longitudinal acceleration $G_x$ as motion conditions of the forklift 1, using the IMU (an input of the roll, pitch and yaw angular velocities P, Q, R and the longitudinal acceleration $G_x$).

In step S110, the wheel load acquisition unit 32 detects the wheel loads of the wheels of the forklift 1 (i.e., the input of the wheel loads $F_{z(i)}$).

In step S111, the center-of-gravity inertia value calculation unit 33 acquires a loading state of a load loaded on the forklift 1, and based on the acquired loading state, calculates a position of a center of gravity of the forklift 1 with the load included, and calculates an inertia value including principal axes of inertia about the center of gravity of the forklift 1 with the load included, according to expression (4) above.

In step S112, the second threshold value comparing unit 52 compares the wheel load detection value and the relevant second threshold value for each wheel, and determines whether if all of the wheel load detection values are larger than the respective second threshold values, that is, whether or not at least one wheel load detection value is equal to or smaller than the relevant second threshold value. If at least one wheel load detection value is equal to or smaller than the relevant second threshold value, the routine proceeds to step S114. On the other hand, if all of the wheel load detection values are larger than the respective second threshold values, a determination is made to terminate the overturning prevention control, and the routine proceeds to step S128.

In step S114, the first threshold value comparing unit 48 compares the wheel load detection value and the first threshold value for each wheel, and determines whether or not at least one wheel load detection value is smaller than the relevant first threshold value. If at least one wheel load detection value is smaller than the relevant first threshold value, a determination is made to start overturning prevention control, and the routine proceeds to step S116. On the other hand, if all of the wheel load detection values are equal to or larger than the respective first threshold values, the routine proceeds to step S126.

In step S116, whether or not the wheel load detection value that is smaller than the relevant first threshold value is that of a front wheel is determined (a decrease in the wheel load in the front wheel). If the wheel load detection value that is smaller than the relevant first threshold value is determined to be that of a front wheel, the routine proceeds to step S118. On the other hand, if the wheel load detection value that is smaller than the relevant first threshold value is determined to be that of a rear wheel, the routine proceeds to step S120.

In step S118, whether or not an absolute value of the difference between the wheel loads of the front left and right wheels $|F_{z(1)}-F_{z(2)}|$ is smaller than the third threshold value is determined. If the absolute value of the difference between the wheel loads of the front left and right wheels is smaller than the third threshold value, the routine proceeds to step S122. On the other hand, if the absolute value of the difference between the wheel loads of the front left and right wheels is equal to or larger than the third threshold value, the routine proceeds to step S128.

In step S120, whether or not an absolute value of the difference between the wheel loads of the rear left and right wheels is smaller than the fourth threshold value is determined. If the absolute value of the difference between the wheel loads of the rear left and right wheels $|F_{z(3)}-F_{z(4)}|$ is smaller than the fourth threshold value, the routine proceeds to step S122. On the other hand, if the absolute value of the difference between the wheel loads of the rear left and right wheels is equal to or larger than the fourth threshold value, the routine proceeds to step S128.

In step S122, the control amount arithmetic operation unit 80 calculates a pitch moment control amount PM according to expressions (10) and (11), using the inertia value including the principal axes of inertia about the center of gravity of the forklift 1 with the load included, the acquired wheel loads of the wheels and the detection values of the motion conditions.

As illustrated in FIG. 10, the braking/driving force calculation unit 82 calculates control amounts $F_{FL}$, $F_{FR}$ for braking forces or driving forces of the front left and right wheels in such a manner as to obtain the pitch moment control amount PM.

In step S124, "1" is set for a flag FLAG indicating a start of overturning prevention control.

In step S126, whether or not FLAG=1 is determined. If it is FLAG=1, it is determined that overturning prevention control has been started, and the routine proceeds to step S122. On the other hand, if it is not FLAG=1, it is determined that overturning prevention control has not been started, the routine proceeds to step S128.

In step S128, the control amounts $F_{DRV(i)}$ for the braking forces or the driving forces, which have been acquired by the operational braking/driving force acquisition unit 30, are set as the control amounts $F_{FL}$, $F_{FR}$ for braking forces or driving forces of the front left and right wheels.

In step S130, FLAG=0 is set to terminate the overturning prevention control.

In step S132, the braking/driving force instruction value setting unit 62 sets the control amounts $F_{FL}$, $F_{FR}$ for the braking forces or the driving forces, which have been obtained in step S122 or S128 above, as instruction values $F_{x(i)}$ for braking forces or driving forces of the left and right wheels (an output of the control amounts $F_{FL}$, $F_{FR}$). The braking/driving force generator 26 generates the instruction values $F_{x(i)}$ for braking forces or driving forces of the left and right drive wheels. Then, the routine returns to step S106.

<Test Example>

Figure 12:
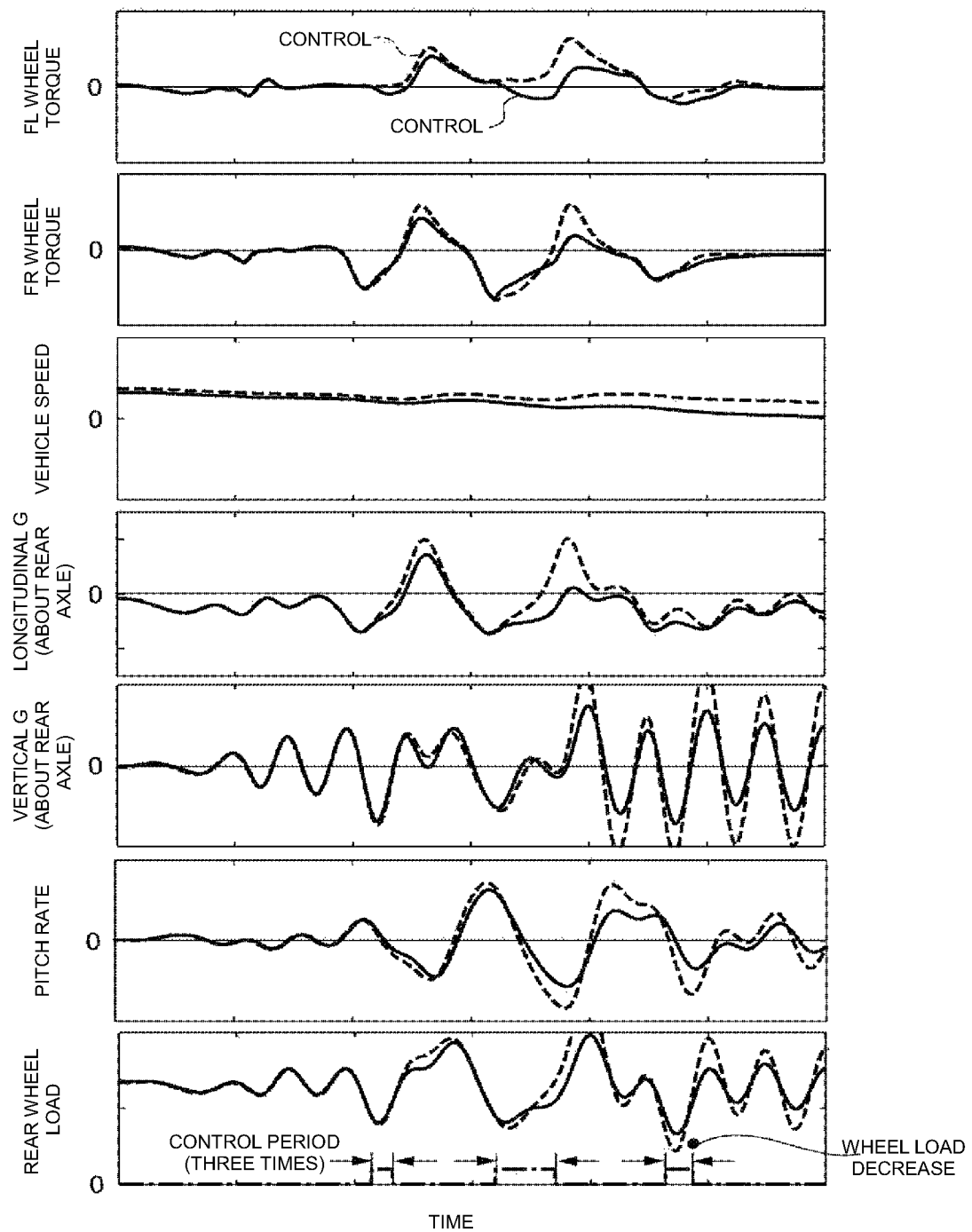
FIG. 12 is a graph indicating a result of a test using overturning prevention control in the vehicle control device according to the first embodiment of the present disclosure.

In FIG. 12, as an example of a controllability examination result during straight forward travelling, for a three-wheel forklift, an effect of the longitudinal overturning prevention control by the control unit 56, which has been described in the first embodiment above, is compared with a case where overturning prevention control is not performed. It can be seen that a rear wheel load decrease is curbed by the overturning prevention control by the control unit 56, which has been described in the first embodiment above.

As has been described, in the vehicle control device according to the first embodiment, overturning prevention control is properly performed according to a loading state of the load by performing longitudinal overturning prevention control of a forklift using the acquired wheel loads of wheels, the inertia value including principal axes of inertia about the center of gravity of the forklift with the load included, and the detection values of motion conditions.

The position of the center of gravity of the entirety of the combination of the forklift and the load can be found out by detecting, e.g., a mass of the load, a loading height, a loading position and the wheel loads. Also, the directions of the principal axes of inertia vary relative to roll, pitch and yaw rotation axes according to the loading state. In other words, a rotational motion, including rolling and pitching, of the forklift is accurately expressed by setting the principal axis inertias and the products of inertia according to the loading state. Since the control device is configured using an inertia tensor that is based on the principal axis inertias and the products of inertia according to the loading state of the forklift, precise control amounts for overturning prevention are calculated.

Optimum overturning prevention control amounts are calculated for vehicle motion conditions that vary every moment, using vehicle parameters (the principal axis inertias and the products of inertia) and detection values of rotational motion of the vehicle according to the loading state.

A control amount that makes the pitch angular acceleration zero is calculated based on a rotational motion model for the vehicle, using the above set inertias and detection values of angular velocities, angular accelerations and the wheel loads.

Also, overturning prevention suitable for a loading state is performed by changing the first to fourth threshold values according to the loading state and performing overturning prevention control when the wheel loads are smaller than the respective threshold values. According to the present embodiment, the controller performs overturning prevention control hat suppresses an increase in difference between the wheel loads of front and rear wheels of the vehicle, using the acquired wheel loads of the wheels, the inertia value, and detection values of the motion conditions.

Also, in overturning prevention control, switching of control is enabled by recognizing which wheel has a decreased load and whether or not an absolute value of the difference between the loads of the left and right wheels is equal to or larger than the third threshold value or the fourth threshold value.

Second Embodiment

<Configuration of Vehicle Control Device>

Next, a vehicle control device according to a second embodiment will be described. Note that each of parts having a configuration that is similar to that of the first embodiment is provided with the same sign reference numeral as that of the first embodiment and description thereof is omitted.

The second embodiment is different from the first embodiment in that lateral overturning prevention control is performed.

Figure 13:
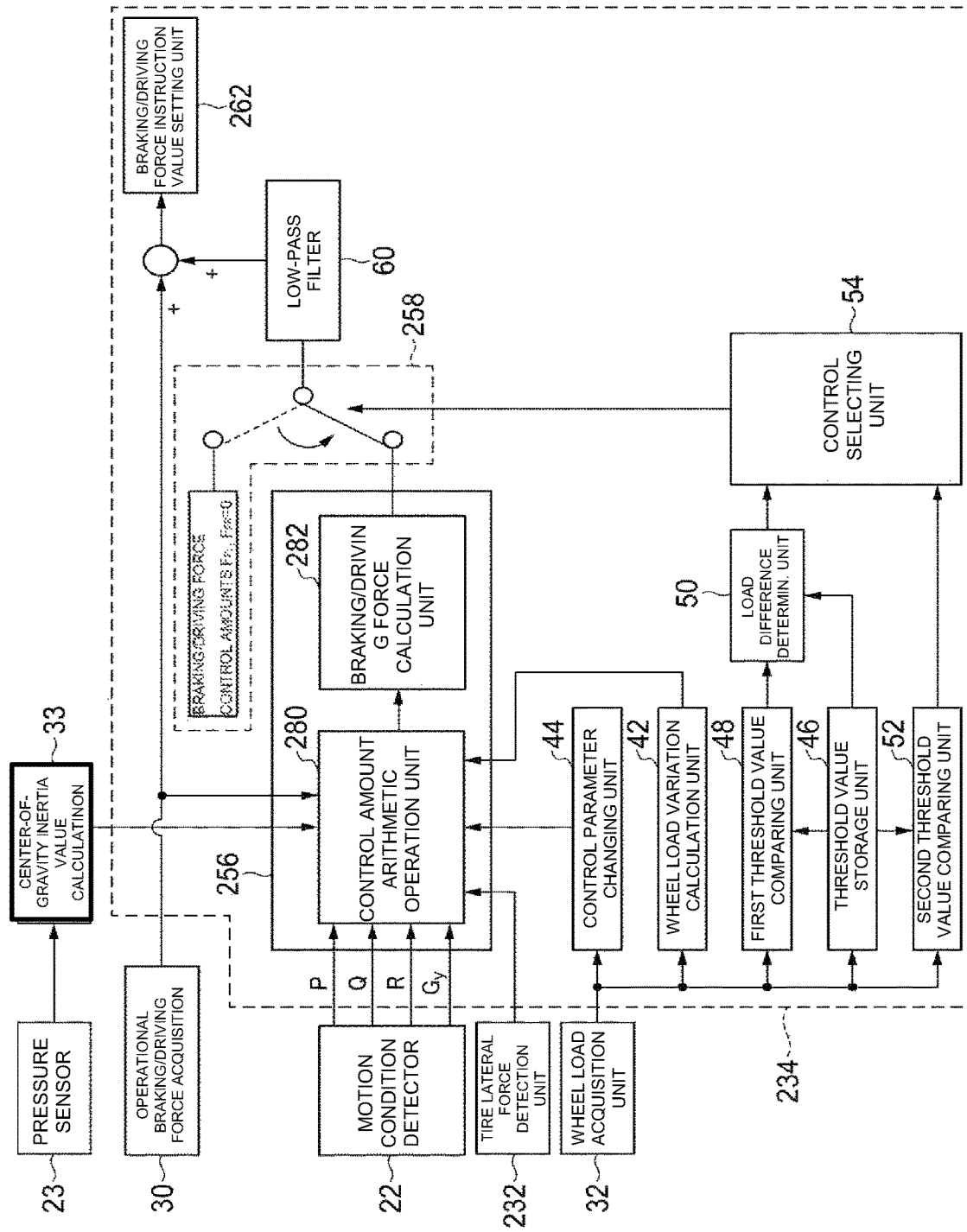
FIG. 13 is a block diagram illustrating a configuration of a braking/driving force control unit in a vehicle control device according to a second embodiment of the present disclosure.

As illustrated in FIG. 13, the vehicle control device according to the second embodiment includes a tire lateral force detection unit 232 configured to detect tire lateral forces of wheels.

In addition, the vehicle control device of the second embodiment further includes a braking/driving force control unit 234 including a control parameter changing unit 42, a wheel load variation calculation unit 44, a threshold value storage unit 46, a first threshold value comparing unit 48, a control selecting unit 54, a second threshold value comparing unit 52, a control unit 256, a control amount switching unit 258, a low-pass filter 60 and a braking/driving force instruction value setting unit 262. Note that each of the control selecting unit 54, the control unit 256, the control amount switching unit 258 and the braking/driving force instruction value setting unit 262 is an example of a control unit of the present disclosure.

The control unit 256 calculates control amounts for controlling braking forces or driving forces of drive wheels, using an inertia value including principal axes of inertia about a center of gravity of a forklift 1 with a load included, acquired wheel loads of wheels, detection values of the motion conditions and detection values of the tire lateral forces of the wheels.

More specifically, the control unit 256 includes a control amount arithmetic operation unit 280 and a braking/driving force calculation unit 282.

The control amount arithmetic operation unit 280 calculates a yaw moment control amount YM, using the inertia value including the principal axes of inertia about the center of gravity of the forklift 1 with the load included, the acquired wheel loads of the wheels, the detection values of the motion conditions and the detection values of the tire lateral forces of the wheels.

Here, a principle for calculating the yaw moment control amount YM will be described.

The second embodiment relates to lateral overturning prevention control. As in the first embodiment, the second embodiment is applied to a front-wheel-motor-drive forklift, and is premised on measurement of wheel loads, a roll angular velocity P, a pitch angular velocity Q, a yaw angular velocity R and a lateral acceleration $G_y$.

In the second embodiment, a yaw moment $N_v$ is used for curbing a roll angular acceleration $\dot{P}$ as described below. Since $N_v$ is not included in the first row of expression (1) above, the third row in expression (1) is rearranged to factor out a yaw angular acceleration $\dot{R}$ and the yaw angular acceleration $\dot{R}$ is substituted into $\dot{R}$ on the first row to control the roll angular acceleration $\dot{P}$ via the yaw moment $N_v$.

If expression (4) is substituted into expression (1) and the third row is expanded, the following expression is obtained.

$$J_{xz}\cdot\dot{P}+J_{yz}\cdot\dot{Q}+J_{zz}\cdot\dot{R}=(J_{xx}\cdot Q-J_{xy}\cdot P)\cdot P+(J_{zy}\cdot Q-J_{yy}\cdot P)\cdot Q+ (J_{xz}\cdot Q-J_{yz}\cdot P)\cdot R+N_v \quad (21)$$

If expression (21) is transformed to factor out $\dot{R}$, the following expression is obtained.

$$\dot{R}=1/J_{zz}\cdot[-J_{xz}\cdot\dot{P}-J_{yz}\cdot\dot{Q}+(J_{xx}\cdot Q-J_{xy}\cdot P)\cdot P+(J_{zy}\cdot Q-J_{yy}\cdot P) \cdot Q+(J_{xz}\cdot Q-J_{yz}\cdot P)\cdot R+N_v] \quad (22)$$

Expression (22) is rearranged as the following expression, by being substituted into the first row of expression (1).

$$(J_{xx}-J_{xz}^2/J_{zz})\cdot\dot{P}=-(J_{xy}-J_{yz}\cdot J_{xz}/J_{zz})\cdot\dot{Q}-J_{xz}/J_{zz}\cdot[(J_{xx}\cdot Q-J_{xy}\cdot P)\cdot P+(J_{zy}\cdot Q-J_{yy}\cdot P)\cdot Q+(J_{xz}\cdot Q-J_{yz}\cdot P)\cdot R]-J_{xz}/J_{zz}\cdot N_v+(J_{xy}\cdot R-J_{xz}\cdot Q)\cdot P+(J_{yy}\cdot R-J_{yz}\cdot Q)\cdot Q+(J_{yz}\cdot R-J_{zz}\cdot Q)\cdot R+L_v \quad (23)$$

A yaw moment $N_v^*$ that makes the roll angular acceleration $\dot{P}$ zero is obtained according to the following expression, by transformation of expression (23) with the left side as zero.

$$N_v^* = (-J_{zz}\cdot J_{xy}/J_{xz}+J_{yz})\cdot\dot{Q}-[J_{xx}\cdot Q-J_{xy}\cdot P)\cdot P+(J_{zy}\cdot Q-J_{yy}\cdot P)\cdot Q+(J_{xz}\cdot Q-J_{yz}\cdot P)\cdot R]+J_{zz}/J_{xz}\cdot[(J_{xy}\cdot R-J_{xz}\cdot Q)\cdot \dot{P}+(J_{yy}\cdot R-J_{yz}\cdot Q)\cdot Q+(J_{yz}\cdot R-J_{zz}\cdot Q)\cdot R+L_v] \quad (24)$$

In expression (24), Q is obtained by, e.g., pseudo-differentiation of the angular velocity Q. The roll moment $L_v$ in expression (24) is represented by expression (25) including a sum of a moment according to an inertia force, a moment acting on the vehicle according to a tire lateral force and a moment according to a change amount (load variation) of a tire spring (vertical spring) reaction force, according to FIG. 7A.

$$L_v = M_{all}\cdot G_{yCG}\cdot(h_{CG}-h_R)+(\Delta FL_z+\Delta RL_z)\cdot t_f-(\Delta FR_z+\Delta RR_z)\cdot t_r \quad (25)$$

In expression (25), a moment ($=M_{all}\cdot g\cdot(h_{CG}-h_R)\cdot\sin\phi\cdot\cos\theta$) generated by center-of-gravity shifting in a y-axis direction according to rolling and pitching is omitted, because $\phi$ and $\theta$ have just a small value and the moment does not cause overturning that makes wheels be lifted up. A yaw moment $N_v$ in a case where lateral overturning prevention control is performed during a driver's operation such as steering, acceleration or braking is represented by the following expression, which is a sum of tire longitudinal forces $F_{DRV\_L}$, $F_{DRV\_R}$ of the two drive wheels, which have been generated by the driver's steering, acceleration or braking, a moment generated by tire lateral forces $F_{LFy}$, $F_{RFy}$, $R_{LFy}$, $R_{RFy}$ of the wheels and YM, which is a lateral overturning prevention control amount.

$$N_v=-F_{DRV\_L}\cdot t_f+F_{DRV\_R}\cdot t_r+(FL_{Fy}+FR_{Fy})\cdot l_f-(RL_{Fy}+RR_{Fy})\cdot l_r+YM \quad (26)$$

A lateral overturning prevention control amount YM that makes a roll angular acceleration $\dot{P}$ zero during the driver's operation is obtained by the following expression based on expressions (24) and (26).

$$YM=F_{DRV\_L}\cdot t_f-F_{DRV\_R}\cdot t_r-(FL_{Fy}+FR_{Fy})\cdot l_f+(RL_{Fy}+RR_{Fy})\cdot l_r+N_v^* \quad (27)$$

$N_v^*$ in expression (27) is obtained according to expression (24), the tire longitudinal forces $F_{DRV\_L}$, $F_{DRV\_R}$ are obtained from a braking/driving force instruction according to the driver's operation, and the tire lateral forces $F_{LFy}$, $F_{RFy}$, $R_{LFy}$, $R_{RFy}$ are obtained by estimation or measurement.

In order to curb a yaw motion using YM, a sign is provided to YM obtained according to expression (27), as the following expression.

$$YM=-YM \quad (28)$$

As with the above-described principle, the control amount arithmetic operation unit 280 calculates the yaw moment control amount YM according to expressions (27) and (28), using the inertia value including the principal axes of inertia about the center of gravity of the forklift 1 with the load included, the acquired wheel loads of the wheels, the detection values of the motion conditions, and the detection values of the tire lateral forces.

Figure 14A:
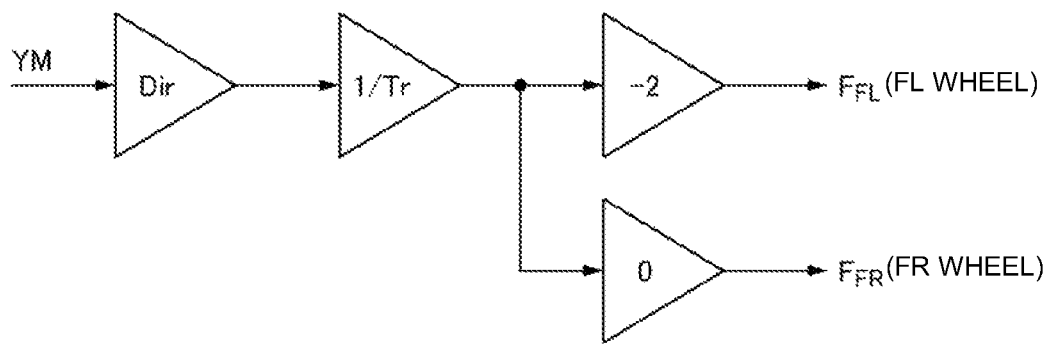
FIGS. 14A and 14B are diagrams for describing processing by a braking/driving force calculator.
Figure 14B:
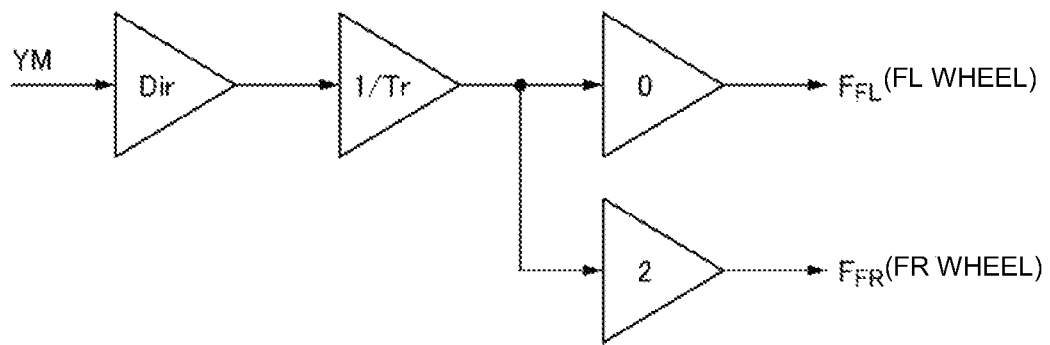

As illustrated in FIGS. 14A and 14B, the braking/driving force calculation unit 282 calculates control amounts $F_{FL}$, $F_{FR}$ for braking forces or driving forces of the front left and right wheels in such a manner as to obtain the yaw moment control amount YM. "Dir" in FIGS. 14A and 14B is a flag indicating forward or backward travelling, in which '+1' is forward travelling and '−1' is backward travelling. When it is turning right, as illustrated in FIG. 14A, the yaw moment control amount YM is converted into a tire braking/driving force by being divided by Tr, which is a distance between the left and right wheels, and the tire braking/driving force is multiplied by '0' for the right wheel and '−2' for the left wheel to obtain tire braking/driving forces of the left and right wheels. In addition, when it is turning left, as illustrated in FIG. 14B, the yaw moment control amount YM is converted into a tire braking/driving force by being divided by Tr, and the tire braking/driving force is multiplied by '2' for the right wheel and '0' for the left wheel to obtain tire braking/driving forces of the left and right wheels.

If lateral overturning prevention control is started, the control amount switching unit 258 outputs the control amounts $F_{FL}$, $F_{FR}$ for braking forces or driving forces, which have been obtained by the control unit 256.

Also, if the lateral overturning prevention control is terminated, the control amount switching unit 258 outputs control amounts "$F_{FL}$, $F_{FR}$=0".

In order to curb an abrupt change in braking/driving force due to switching between lateral overturning prevention control being performed and not being performed, the low-pass filter 60 performs low-pass filtering. More specifically, the low-pass filter 60 performs low-pass filtering for values resulting from addition of the control amounts $F_{FL}$, $F_{FR}$ for braking forces or driving forces, which have been output by the control amount switching unit 258, to control amounts $F_{DRV(i)}$ for braking forces or driving forces, which have been acquired by the operational braking/driving force acquisition unit 30.

The braking/driving force instruction value setting unit 262 sets the values output by the low-pass filter 60, as instruction values $F_{x(i)}$ for braking forces or driving forces of the left and right wheels. A braking/driving force generator 26 generates the instruction values $F_{x(i)}$ for braking forces or driving forces of the left and right drive wheels.

<Operation of Vehicle Control System>

Next, operation of the vehicle control system according to the second embodiment will be described.

Figure 15:
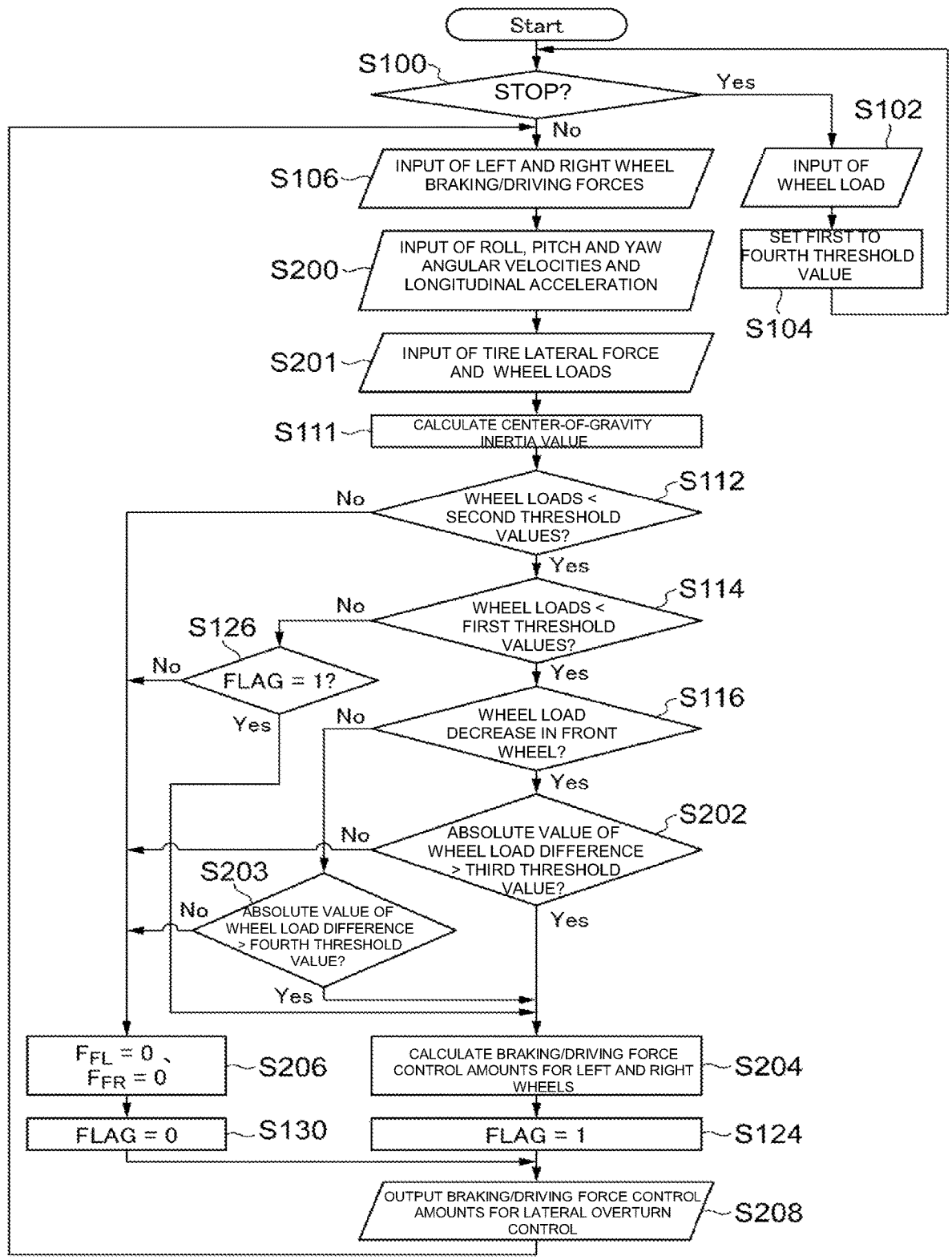
FIG. 15 is a flowchart illustrating a content of an overturning prevention control processing routine in the vehicle control device according to the second embodiment of the present disclosure.

Upon a power supply of the forklift 1 being turned on in a state in which a load is loaded on forks 13 of the forklift 1 with the vehicle control device mounted thereon, in a computer 24, the overturning prevention control processing routine illustrated in FIG. 15 is executed. Note that processing that is similar to that of the first embodiment is provided with the same sign as that of the first embodiment, and the detailed description thereof is omitted.

First, in step S100, whether or not the forklift 1 is at a stop is determined, and if it is determined that the forklift 1 is at a stop, the routine proceeds to step S102, and if it is determined that the forklift 1 is not at a stop, the routine proceeds to step S106.

In step S102, a wheel load acquisition unit 32 detects wheel loads of the wheels (i.e., the input of the wheel loads $F_{z(i)}$. The control parameter changing unit 42 and the threshold value storage unit 46 acquire wheel loads of the wheels in a state in which the forklift 1 is at a stop and differences between the wheel loads of the left and right wheels.

In step S104, the threshold value storage unit 46 sets a first threshold value and a second threshold value for the wheel load of each wheel, a third threshold value for the difference between the wheel loads of the front left and right wheels and a fourth threshold value for the difference between the wheel loads of the rear left and right wheels according to the wheel loads of the wheels in a state in which the forklift 1 is at a stop and the differences between the wheel loads of the left and right wheels, which have been acquired in step S102 above, and the routine returns to step S100. The control parameter changing unit 42 and the threshold value storage unit 46 corresponds to a threshold value changer that acquire wheel loads of the wheels in a state in which the vehicle is at a stop and a difference between the wheel loads of left and right wheels, and change threshold values for the wheel loads of the wheels and a threshold value for the difference between the wheel loads of the left and right wheels according to the wheel loads of the wheel.

In step S106, the operational braking/driving force acquisition unit 30 acquires control amounts $F_{DRV(i)}$ for braking forces and driving forces of the drive wheels, based on the driver's operation detected by the operation detector 20 (the input of left and right wheel braking/driving forces $F_{DRV(i)}$ based on instruction by driver's operation).

In step S200, a motion condition detector 22 detects a roll angular velocity P, a pitch angular velocity Q, a yaw angular velocity R and a lateral acceleration $G_y$, as motion conditions of the forklift 1, using an IMU (an input of the roll, pitch and yaw angular velocities P, Q, R and the lateral acceleration $G_y$.)

In step S201, the wheel load acquisition unit 32 detects wheel loads of the wheels of the forklift 1. Also, the tire lateral force detection unit 232 detects tire lateral forces of the wheels of the forklift 1 (i.e., the input of the lateral forces and the wheel loads $F_{z(i)}$).

In step S111, a center-of-gravity inertia value calculation unit 33 acquires a loading state of a load loaded on the forklift 1, and based on the acquired loading state, calculates a position of a center of gravity of the forklift 1 with the load included, and calculates an inertia value including principal axes of inertia about the center of gravity of the forklift 1 with the load included, according to expression (4) above.

In step S112, the second threshold value comparing unit 52 compares the wheel load detection value and the relevant second threshold value for each wheel, and determines whether if all of the wheel load detection values are larger than the respective second threshold values, that is, whether or not at least one wheel load detection value is equal to or smaller than the relevant second threshold value in step S112. If at least one wheel load detection value is equal to or smaller than the relevant second threshold value, the routine proceeds to step S114. On the other hand, if all of the wheel load detection values are larger than the respective second threshold values, a determination is made to terminate the overturning prevention control, and the routine proceeds to step S206.

In step S114, the first threshold value comparing unit 48 compares the wheel load detection value and the first threshold value for each wheel, and determines whether or not at least one wheel load detection value is smaller than the relevant first threshold value. If at least one wheel load detection value is smaller than the relevant first threshold value, a determination is made to start overturning prevention control, and the routine proceeds to step S116. On the other hand, if all of the wheel load detection values are equal to or larger than the respective first threshold values, the routine proceeds to step S126.

In step S116, whether or not the wheel load detection value that is smaller than the relevant first threshold value is that of a front wheel is determined (a decrease in the wheel load in the front wheel). If the wheel load detection value that is smaller than the relevant first threshold value is determined to be that of a front wheel, the routine proceeds to step S202. On the other hand, if the wheel load detection value that is smaller than the relevant first threshold value is determined to be that of a rear wheel, the routine proceeds to step S203.

In step S202, whether or not an absolute value of the difference between the wheel loads of the front left and right wheels $|F_{z(1)}-F_{z(2)}|$ is larger than the third threshold value is determined. If the absolute value of the difference between the wheel loads of the front left and right wheels is larger than the third threshold value, the routine proceeds to step S204. On the other hand, if the absolute value of the difference between the wheel loads of the front left and right wheels is equal to or smaller than the third threshold value, the routine proceeds to step S206.

In step S203, whether or not an absolute value of the difference between the wheel loads of the rear left and right wheels $|F_{z(3)}-F_{z(4)}|$ is larger than the fourth threshold value is determined. If the absolute value of the difference between the wheel loads of the rear left and right wheels is equal to or smaller than the fourth threshold value, the routine proceeds to step S206. On the other hand, if the absolute value of the difference between the wheel loads of the rear left and right wheels is larger than the fourth threshold value, the routine proceeds to step S204.

In step S204, the control amount arithmetic operation unit 280 calculates a yaw moment control amount YM according to expressions (27) and (28), using the inertia value including the principal axes of inertia about the center of gravity of the forklift 1 with the load included, the acquired wheel loads of the wheels, detection values of the motion conditions and detection values of the tire lateral forces.

As illustrated in FIGS. 14A and 14B, the braking/driving force calculation unit 282 calculates the control amounts $F_{FL}$, $F_{FR}$ for braking forces or driving forces of the front left and right wheels in such a manner as to obtain the yaw moment control amount YM.

In step S124, "1" is set for a flag FLAG indicating a start of overturning prevention control.

In step S126, whether or not FLAG=1 is determined. If FLAG=1, it is determined that overturning prevention control has been started, and the routine proceeds to step S204. On the other hand, if it is not FLAG=1, it is determined that overturning prevention control has not been started, the routine proceeds to step S206.

In step S206, the control amounts $F_{FL}$, $F_{FR}$ for braking forces or driving forces of the front left and right wheels are set to 0.

In step S130, FLAG=0 is set to terminate the overturning prevention control.

In step S208, the braking/driving force instruction value setting unit 62 sets the control amounts $F_{FL}$, $F_{FR}$ for the braking forces or the driving forces, which have been obtained in step S122 or S128 above, as instruction values $F_{x(i)}$ for braking forces or driving forces of the left and right wheels (an output of the control amounts $F_{FL}$, $F_{FR}$). The braking/driving force generator 26 generates the instruction values $F_{x(i)}$ for braking forces or driving forces of the left and right drive wheels. Then, the routine returns to step S106.

As has been described, in the vehicle control device according to the second embodiment, the overturning prevention control is properly performed according to a loading state of a load by performing lateral overturning prevention control of a forklift using the acquired wheel loads of wheels, the inertia value including principal axes of inertia about the center of gravity of the forklift with the load included, and the detection values of motion conditions. According to the present embodiment, the controller is configured to perform overturning prevention control that suppresses an increase in difference between the wheel loads of left and right wheels of the vehicle, using the acquired wheel loads of the wheels, the inertia value, and detection values of the motion conditions.

Third Embodiment

<Configuration of Vehicle Control Device>

Next, a vehicle control device according to a third embodiment will be described. Note that parts each having a configuration that is similar to that of the first and second embodiments are provided with the same sign as that of the first and second embodiments and description thereof is omitted.

The third embodiment is different from the second embodiment in that tire lateral forces are not measured.

Figure 16:
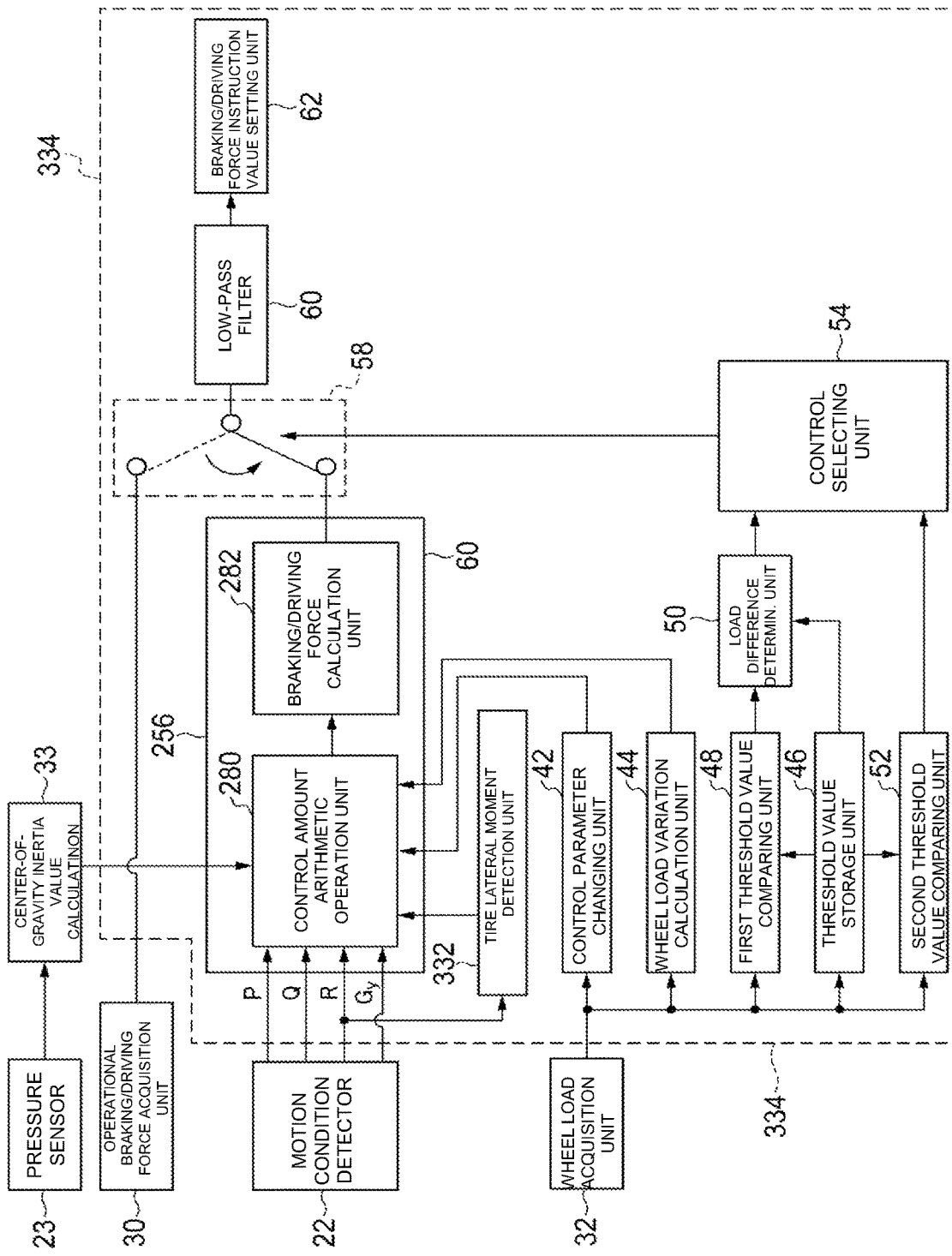
FIG. 16 is a block diagram illustrating a configuration of a braking/driving force control unit in a vehicle control device according to a third embodiment of the present disclosure.

As illustrated in FIG. 16, a braking/driving force control unit 334 of the vehicle control device according to the third embodiment includes a control parameter changing unit 42, a wheel load variation calculation unit 44, a threshold value storage unit 46, a first threshold value comparing unit 48, a control selecting unit 54, a second threshold value comparing unit 52, a tire lateral force moment calculation unit 332, a control unit 256, a control amount switching unit 58, a low-pass filter 60 and a braking/driving force instruction value setting unit 62. Note that each of the control selecting unit 54, the control unit 256, the control amount switching unit 58 and the braking/driving force instruction value setting unit 62 corresponds to a controller of the present disclosure.

The tire lateral force moment calculation unit 332 calculates a physical value relating to a moment caused by tire lateral forces, based on a derivative value R of a yaw angular velocity R and differences between a position of a center of gravity of the entire forklift 1 and positions of centers of gravity of components.

More specifically, in an ordinary vehicle, it is generally difficult to measure the tire lateral forces $F_{LFy}$, $F_{RFy}$, $R_{LFy}$, $R_{RFy}$ in expression (27), and in the present embodiment, substitution of such tire lateral forces is performed. The terms other than $N_v^*$ in expression (27) are represented by the following expression, by the tire lateral forces on the right side of expression (27) being substituted in a simplified manner with a two-wheel model and application of tire longitudinal forces by a driver's operation during lateral overturning prevention control being regarded as stopped ($F_{DRV\_L}=0$, $F_{DRV\_R}=0$).

$$(FL_{Fy}+FR_{Fy}) \cdot l_f + (RL_{Fy}+RR_{Fy}) \cdot l_r \approx -J_{zz} \cdot \dot{R} \qquad (29)$$

As described above, the tire lateral force moment calculation unit 332 calculates a physical value $-J_{zz} \cdot \dot{R}$ relating to a moment caused by tire lateral forces, based on a derivative value $\dot{R}$ of a yaw angular velocity R and differences between a position of a center of gravity of the entire forklift 1 and positions of centers of gravity of the components.

In a control amount arithmetic operation unit 280, expression (27) is replaced with the following expression, using expression (29).

$$YM = -J_{zz} \cdot \dot{R} + N_v^* \qquad (30)$$

As in expression (28), a sign of YM is inverted.

$$YM = -YM \qquad (31)$$

<Operation of Vehicle Control Device>

Next, operation of the vehicle control device according to the third embodiment will be described.

Figure 17:
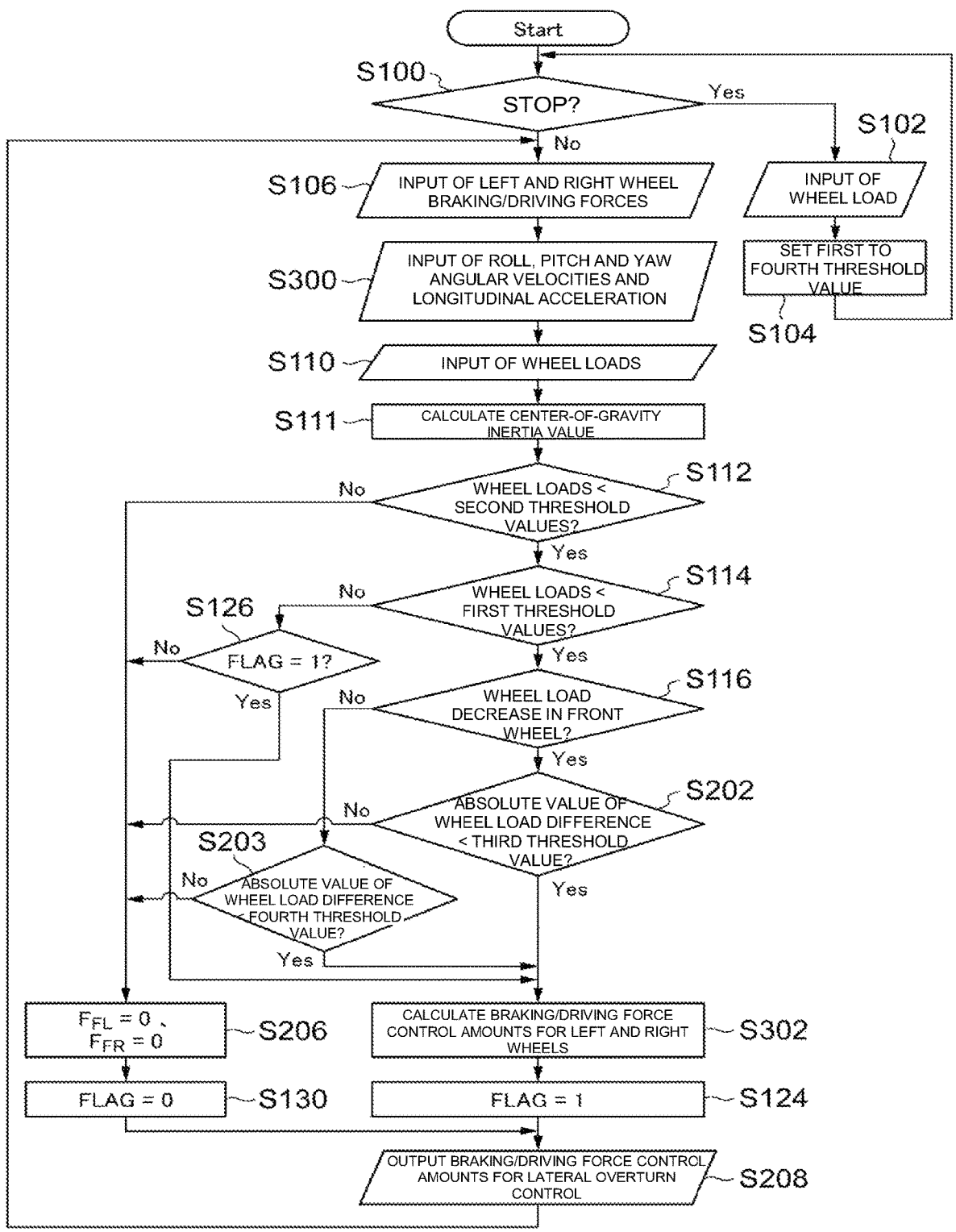
FIG. 17 is a flowchart illustrating a content of an overturning prevention control processing routine in the vehicle control device according to the third embodiment of the present disclosure.

Upon a power supply of the forklift 1 being turned on in a state in which a load is loaded on forks 13 of the forklift 1 with the vehicle control device mounted thereon, in a computer 24, the overturning prevention control processing routine illustrated in FIG. 17 is executed. Note that processing that is similar to that of the first embodiment is provided with the same sign as that of the first and second embodiments and detailed description thereof is omitted.

First, in step S100, whether or not the forklift 1 is at a stop is determined, and if it is determined that the forklift 1 is at a stop, the routine proceeds to step S102, and if it is determined that the forklift 1 is not at a stop, the routine proceeds to step S106.

In step S102, a wheel load acquisition unit 32 detects wheel loads of the wheels (i.e., the input of the wheel loads $F_{z(i)}$. The control parameter changing unit 42 and the threshold value storage unit 46 acquire wheel loads of the wheels in a state in which the forklift 1 is at a stop and differences between the wheel loads of the left and right wheels.

In step S104, the threshold value storage unit 46 sets a first threshold value and a second threshold value for the wheel load of each wheel, a third threshold value for the difference between the wheel loads of the front left and right wheels and a fourth threshold value for the difference between the wheel loads of the rear left and right wheels according to the wheel loads of the wheels in a state in which the forklift 1 is at a stop and the differences between the wheel loads of the left and right wheels, which have been acquired in step S102 above, and the routine returns to step S100.

In step S106, an operational braking/driving force acquisition unit 30 acquires control amounts $F_{DRV(i)}$ for braking forces and driving forces of the drive wheels, based on the driver's operation detected by the operation detector 20 (the input of left and right wheel braking/driving forces $F_{DRV(i)}$ based on instruction by driver's operation).

In step S300, a motion condition detector 22 detects a roll angular velocity P, a pitch angular velocity Q, a yaw angular velocity R, and a lateral acceleration $G_y$ as motion conditions of the forklift 1, using an IMU (an input of the roll, pitch and yaw angular velocities P, Q, R and the lateral acceleration $G_y$).

In step S110, the wheel load acquisition unit 32 detects wheel loads of the wheels of the forklift 1 (i.e., the input of the wheel loads $F_{z(i)}$.

In step S111, a center-of-gravity inertia value calculation unit 33 acquires a loading state of a load loaded on the forklift 1, and based on the acquired loading state, calculates a position of a center of gravity of the forklift 1 with the load included, and calculates an inertia value including principal axes of inertia about the center of gravity of the forklift 1 with the load included, according to expression (4) above.

In step S112, the second threshold value comparing unit 52 compares the wheel load detection value and the relevant second threshold value for each wheel, and determines whether if all of the wheel load detection values are larger than the respective second threshold values, that is, whether or not at least one wheel load detection value is equal to or smaller than the relevant second threshold value in step S112. If at least one wheel load detection value is equal to or smaller than the relevant second threshold value, the routine proceeds to step S114. On the other hand, if all of the wheel load detection values are larger than the respective second threshold values, a determination is made to terminate the overturning prevention control, and the routine proceeds to step S206.

In step S114, the first threshold value comparing unit 48 compares the wheel load detection value and the first threshold value for each wheel, and determines whether or not at least one wheel load detection value is smaller than the relevant first threshold value. If at least one wheel load detection value is smaller than the relevant first threshold value, a determination is made to start overturning prevention control, and the routine proceeds to step S116. On the other hand, if all of the wheel load detection values are equal to or larger than the respective first threshold values, the routine proceeds to step S126.

In step S116, whether or not the wheel load detection value that is smaller than the relevant first threshold value is that of a front wheel is determined (a decrease in the wheel load in the front wheel). If the wheel load detection value that is smaller than the relevant first threshold value is determined to be that of a front wheel, the routine proceeds to step S202. On the other hand, if the wheel load detection value that is smaller than the relevant first threshold value is determined to be that of a rear wheel, the routine proceeds to step S203.

In step S202, whether or not an absolute value of the difference between the wheel loads of the front left and right wheels $|F_{z(1)}-F_{z(2)}|$ is larger than the third threshold value is determined. If the absolute value of the difference between the wheel loads of the front left and right wheels is larger than the third threshold value, the routine proceeds to step S302. On the other hand, if the absolute value of the difference between the wheel loads of the front left and right wheels is equal to or smaller than the third threshold value, the routine proceeds to step S206.

In step S203, whether or not an absolute value of the difference between the wheel loads of the rear left and right wheels $|F_{z(3)}-F_{z(4)}|$ is larger than the fourth threshold value is determined. If the absolute value of the difference between the wheel loads of the rear left and right wheels is equal to or smaller than the fourth threshold value, the routine proceeds to step S206. On the other hand, if the absolute value of the difference between the wheel loads of the rear left and right wheels is larger than the fourth threshold value, the routine proceeds to step S302.

In step S302, the control amount arithmetic operation unit 280 calculates a yaw moment control amount YM according to expressions (30) and (31), using the inertia value including the principal axes of inertia about the center of gravity of the forklift 1 with the load included, the acquired wheel loads of the wheels and the detection values of the motion conditions.

As illustrated in FIG. 14, a braking/driving force calculation unit 282 calculates control amounts $F_{FL}$, $F_{FR}$ for braking forces or driving forces of the front left and right wheels in such a manner as to obtain the yaw moment control amount YM.

In step S124, "1" is set for a flag FLAG indicating a start of overturning prevention control.

In step S126, whether or not FLAG=1 is determined. If FLAG=1, it is determined that overturning prevention control has been started, and the routine proceeds to step S302. On the other hand, if it is not FLAG=1, it is determined that overturning prevention control has not been started, the routine proceeds to step S206.

In step S206, the control amounts FFL, FFR for braking forces or driving forces of the front left and right wheels are set to 0.

In step S130, FLAG=0 is set to terminate the overturning prevention control.

In step S208, the braking/driving force instruction value setting unit 62 sets the control amounts $F_{FL}$, $F_{FR}$ for the braking forces or the driving forces, which have been obtained in step S206 or S302 above, as instruction values $F_{x(i)}$ for braking forces or driving forces of the left and right wheels. A braking/driving force generator 26 generates the instruction values $F_{x(i)}$ for braking forces or driving forces of the left and right drive wheels. Then, the routine returns to step S106.

<Text Example>

Figure 18:
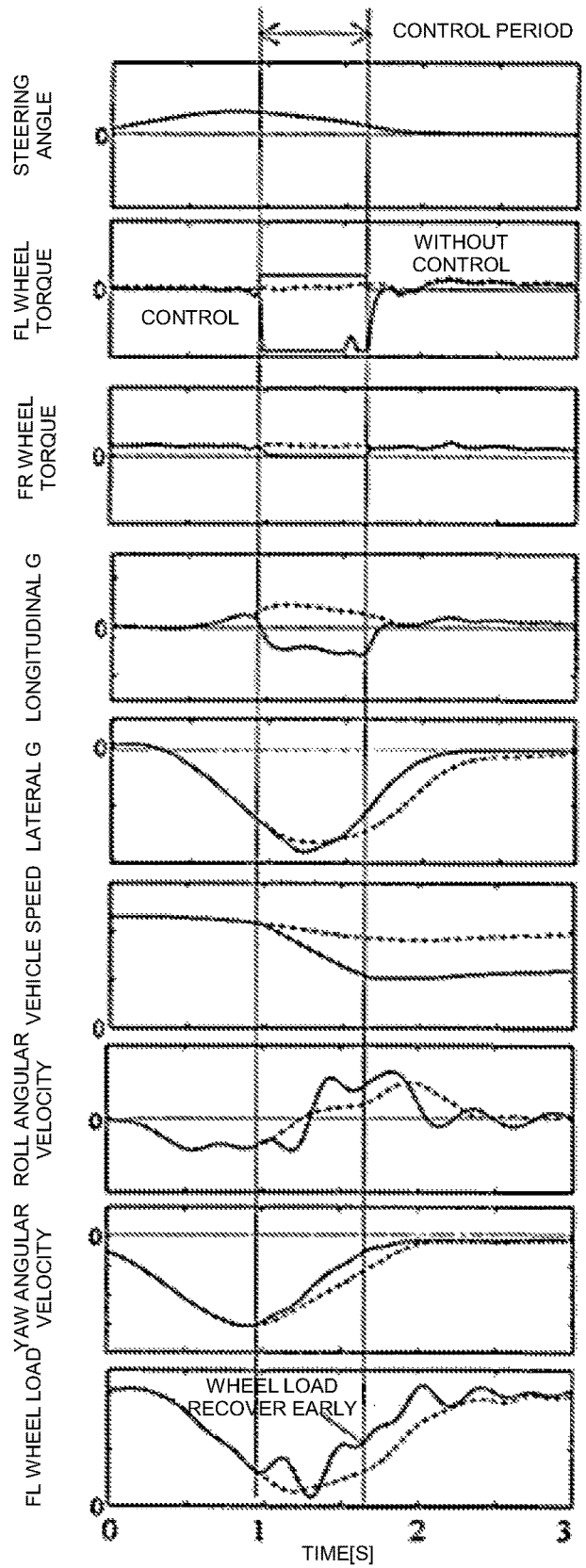
FIG. 18 is a graph indicating a result of a test using overturning prevention control in the vehicle control device according to the third embodiment of the present disclosure.

In FIG. 18, for a three-wheel forklift, an effect of the lateral overturning prevention control by the control unit 256, which has been described in the third embodiment above, is compared with a case where overturning prevention control is not performed. It can be seen that as a result of the overturning prevention control by the control unit 256, which has been described in the third embodiment above, a wheel load decrease (load release) is suppressed at an early stage in comparison with the case where the control is not performed, and the effect of lateral overturning prevention is obtained.

As described above, in the vehicle control device according to the third embodiment, even where tire lateral forces cannot be measured, overturning prevention control is properly performed according to a loading state of a load by performing lateral overturning prevention control of a forklift using the acquired wheel loads of wheels, the inertia value including principal axes of inertia about the center of gravity of the forklift with the load included, and the detection values of motion conditions.

The present disclosure is not limited to the above-described embodiments and various modifications and applications are possible without departing from the spirit of the disclosure.

Figure 19:
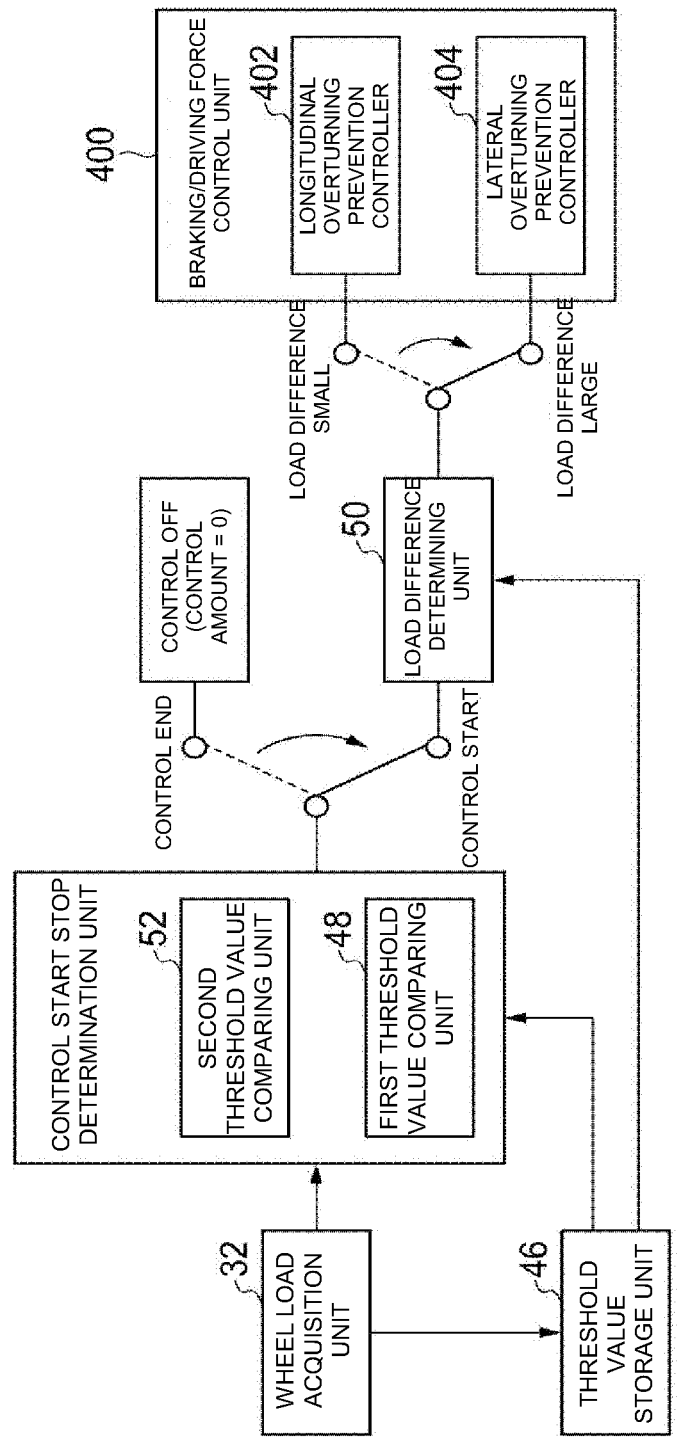
FIG. 19 is a block diagram illustrating a configuration of a vehicle control device according to an alteration of an embodiment of the present disclosure.

For example, the longitudinal overturning prevention control described in the first embodiment above and the lateral overturning prevention control described in the second embodiment, or the third embodiment above may be combined. More specifically, as illustrated in FIG. 19, a vehicle control device may include a wheel load acquisition unit 32, a threshold value storage unit 46, a first threshold value comparing unit 48, a second threshold value comparing unit 52, a load difference determining unit 50, and a braking/driving force control unit 400 including a longitudinal overturning prevention control unit 402 and a lateral overturning prevention control unit 404. In such case, the longitudinal overturning prevention control unit 402 includes the motion condition detector 22, the pressure sensor 23, the operational braking/driving force acquisition unit 30, the center-of-gravity inertia value calculation unit 33, the control parameter changing unit 42, the wheel load variation calculation unit 44, the control selecting unit 54, the control unit 56, the control amount switching unit 58, the low-pass filter 60 and the braking/driving force instruction value setting unit 62 in the first embodiment above. Also, the lateral overturning prevention control unit 404 includes the motion condition detector 22, the pressure sensor 23, the operational braking/driving force acquisition unit 30, the center-of-gravity inertia value calculation unit 33, the control parameter changing unit 42, the wheel load variation calculation unit 44, the control selecting unit 54, the control unit 256, the control amount switching unit 258, the low-pass filter 60 and the braking/driving force instruction value setting unit 62 in the second embodiment above or the motion condition detector 22, the pressure sensor 23, the operational braking/driving force acquisition unit 30, the center-of-gravity inertia value calculation unit 33, the control parameter changing unit 42, the wheel load variation calculation unit 44, the control selecting unit 54, the tire lateral force moment calculation unit 332, the control unit 256, the control amount switching unit 58, the low-pass filter 60 and the braking/driving force instruction value setting unit 62 in the third embodiment above.

Although the description has been provided taking a case where a forklift is a control target as an example, the present disclosure is not limited to this case, and a vehicle other than a forklift may be a control target as long as the vehicle on which a load is to be loaded. For example, the present disclosure may be applied to a vehicle control device mounted in a truck, a trailer or a bus, which varies in vehicle weight according to a loading state of a load.

What is claimed is:

1. A vehicle control device comprising:
a motion condition detector configured to detect motion conditions of a vehicle on which a load is to be loaded, the motion conditions including a rotational motion and a longitudinal acceleration of the vehicle;
a wheel load acquisition unit configured to acquire wheel loads of wheels of the vehicle;
a loading state acquisition unit configured to acquire a loading state of the load loaded on the vehicle;
an inertia value calculator configured to calculate an inertia value including principal axes of inertia about a center of gravity of the vehicle with the load included, based on the acquired loading state;
a controller configured to perform overturning prevention control that suppresses an increase in difference between the wheel loads of front and rear wheels of the vehicle by controlling braking forces or driving forces of the wheels of the vehicle, using the acquired wheel loads of the wheels, the inertia value, and detection values of the motion conditions; and
a threshold value changer configured to acquire wheel loads of the wheels in a state in which the vehicle is at a stop and a difference between the wheel loads of left and right wheels, and change threshold values for the wheel loads of the wheels and a difference threshold value for the difference between the wheel loads of the left and right wheels according to the wheel loads of the wheels in a state in which the vehicle is at a stop and the difference between the wheel loads of the left and right wheels, wherein
the controller performs the overturning prevention control, based on a result of comparison of the acquired wheel loads of the wheels with the threshold values, a result of comparison of the difference between the wheel loads of the left and right wheels with the difference threshold value, the inertia value, and the detection values of the motion conditions.

2. A vehicle control device comprising:
a motion condition detector configured to detect motion conditions of a vehicle on which a load is to be loaded thereon, the motion conditions including a rotational motion and a lateral acceleration of the vehicle;
a wheel load acquisition unit configured to acquire wheel loads of wheels of the vehicle;
a loading state acquisition unit configured to acquire a loading state of the load loaded on the vehicle;
an inertia value calculator configured to calculate an inertia value including principal axes of inertia about a center of gravity of the vehicle with the load included, based on the acquired loading state;
a controller configured to perform overturning prevention control that suppresses an increase in difference between the wheel loads of left and right wheels of the vehicle by controlling braking forces or driving forces of the wheels of the vehicle, using the acquired wheel loads of the wheels, the inertia value, and detection values of the motion conditions; and a threshold value changer configured to acquire wheel loads of the wheels in a state in which the vehicle is at a stop and a difference between the wheel loads of left and right wheels, and change threshold values for the wheel loads of the wheels and a difference threshold value for the difference between the wheel loads of the left and right wheels according to the wheel loads of the wheels in a state in which the vehicle is at a stop and the difference between the wheel loads of the left and right wheels, wherein the controller performs the overturning prevention control, based on a result of comparison of the acquired wheel loads of the wheels with the threshold values, a result of comparison of the difference between the wheel loads of the left and right wheels with the difference threshold value, the inertia value, and the detection values of the motion conditions.

3. The vehicle control device according to claim 1, wherein the controller performs the overturning prevention control according to a result of comparison of the difference between the wheel loads of the front and rear wheels with a difference threshold value.

4. The vehicle control device according to claim 2, wherein the controller performs the overturning prevention control according to a result of comparison of the difference between the wheel loads of the left and right wheels with a difference threshold value.

5. The vehicle control device according to claim 1, wherein:
the threshold values for the wheel load of each wheel include a start determination threshold value for determining a start of overturning prevention control for the wheel and an end determination threshold value for determining an end of overturning prevention control for the wheel,
the controller performs the overturning prevention control, when the wheel load of at least one wheel is smaller than the start determination threshold value for the wheel load of the wheel and an absolute value of the difference between the wheel loads of the front and rear wheels is smaller than a difference threshold value for the difference between the wheel loads of the front and rear wheels, and
the controller stops the overturning prevention control when all of the wheel loads of the wheels are larger than the respective end determination threshold values for the wheel loads of the wheels.

6. The vehicle control device according to claim 2, wherein
the threshold values for the wheel load of each wheel include a start determination threshold value for determining a start of overturning prevention control for the wheel and an end determination threshold value for determining an end of overturning prevention control for the wheel,
the controller performs the overturning prevention control when the wheel load of at least one wheel is smaller than the start determination threshold value for the wheel load of the wheel and an absolute value of the difference between the wheel loads of the left and right wheels is larger than a difference threshold value for the difference between the wheel loads of the left and right wheels, and
the controller stops the overturning prevention control when all of the wheel loads of the wheels are larger than the respective end determination threshold values for the wheel loads of the wheels.

7. A method for controlling a vehicle comprising:
detecting motion conditions of a vehicle on which a load is to be loaded, the motion conditions including a rotational motion and a longitudinal acceleration of the vehicle;
acquiring wheel loads of wheels of the vehicle;
acquiring a loading state of the load loaded on the vehicle;
calculating an inertia value including principal axes of inertia about a center of gravity of the vehicle with the load included, based on the acquired loading state;
performing overturning prevention control that curbs an increase in difference between the wheel loads of front and rear wheels of the vehicle by controlling braking forces or driving forces of the wheels of the vehicle by controlling braking forces or driving forces of the wheels of the vehicle, using the acquired wheel loads of the wheels, the inertia value, and detection values of the motion conditions;
acquiring wheel loads of the wheels in a state in which the vehicle is at a stop and a difference between the wheel loads of left and right wheels, and changing threshold values for the wheel loads of the wheels and a difference threshold value for the difference between the wheel loads of the left and right wheels according to the wheel loads of the wheels in a state in which the vehicle is at a stop and the difference between the wheel loads of the left and right wheels; and
performing the overturning prevention control, based on a result of comparison of the acquired wheel loads of the wheels with the threshold values, a result of comparison of the difference between the wheel loads of the left and right wheels with the difference threshold value, the inertia value, and the detection values of the motion conditions.

8. A method for controlling a vehicle comprising:
detecting motion conditions of a vehicle on which a load is to be loaded, the motion conditions including a rotational motion and a lateral acceleration of the vehicle;
acquiring wheel loads of wheels of the vehicle;
acquiring a loading state of the load loaded on the vehicle;
calculating an inertia value including principal axes of inertia about a center of gravity of the vehicle with the load included, based on the acquired loading state;
performing overturning prevention control that curbs an increase in difference between the wheel loads of left and right wheels of the vehicle by controlling braking forces or driving forces of the wheels of the vehicle by controlling braking forces or driving forces of the wheels of the vehicle, using the acquired wheel loads of the wheels, the inertia value, and detection values of the motion conditions;
acquiring wheel loads of the wheels in a state in which the vehicle is at a stop and a difference between the wheel loads of left and right wheels, and changing threshold values for the wheel loads of the wheels and a difference threshold value for the difference between the wheel loads of the left and right wheels according to the wheel loads of the wheels in a state in which the vehicle is at a stop and the difference between the wheel loads of the left and right wheels; and performing the overturning prevention control, based on a result of comparison of the acquired wheel loads of the wheels with the threshold values, a result of comparison of the difference between the wheel loads of the left and right wheels with the difference threshold value, the inertia value, and the detection values of the motion conditions.

* * * * *